United States Patent [19]
Wakahara et al.

[11] Patent Number: 5,875,865
[45] Date of Patent: Mar. 2, 1999

[54] HYDRAULIC-PRESSURE CONTROL SYSTEM FOR FOUR-WHEEL DRIVE VEHICLE WITH HYDRAULIC-PRESSURE OPERATED TRANSFER CLUTCH

[75] Inventors: Tatsuo Wakahara, Kawasaki; Kenichiro Murakami, Atsugi, both of Japan

[73] Assignee: Nissan Motor Co., Ltd., Yokohama, Japan

[21] Appl. No.: 600,254

[22] Filed: Feb. 12, 1996

[30] Foreign Application Priority Data

Feb. 15, 1995  [JP]  Japan .................................... 7-027166

[51] Int. Cl.$^6$ ................................................. B60K 17/344
[52] U.S. Cl. ............................ 180/248; 180/249; 91/444; 192/85 R
[58] Field of Search .................................... 180/233, 248, 180/249; 90/444, 446, 448, 459; 192/85 R

[56] References Cited

U.S. PATENT DOCUMENTS

| | | | |
|---|---|---|---|
| 4,858,646 | 8/1989 | Kato ....................................... | 192/85 R |
| 5,103,930 | 4/1992 | Gierrer ..................................... | 180/279 |
| 5,171,294 | 12/1992 | Takano .................................... | 180/248 |
| 5,687,824 | 11/1997 | Hara et al. ............................. | 192/85 R |

FOREIGN PATENT DOCUMENTS

2-270641  11/1990  Japan .

*Primary Examiner*—Anne Marie Boehler
*Attorney, Agent, or Firm*—Foley & Lardner

[57] ABSTRACT

A hydraulic-pressure control system for a four-wheel drive vehicle with a hydraulic-pressure operated transfer clutch, which is responsive to a controlled clutch pressure applied thereto to distribute a driving torque passing from a transmission between main drive wheels and auxiliary drive wheels, comprises a pilot-operated directional control valve connected to the transfer clutch for cutting off a supply of hydraulic fluid of the controlled clutch pressure to the transfer clutch and for directing hydraulic fluid of the controlled clutch pressure to the transfer clutch. The system includes a clutch pressure control valve provided upstream of the directional control valve, which pressure control valve is responsive to an external pilot pressure for producing the controlled clutch pressure, and a duty-ratio controlled solenoid valve for decreasingly adjusting the external pilot pressure to be output to the pressure-reduction valve in accordance with an increase in a duty ratio. A controller is provided for forcibly outputting a duty-cycle controlled exciting current of a predetermined high duty ratio such as 100% to the duty-ratio controlled solenoid valve to reduce the controlled clutch pressure to a low pressure level (preferably a minimum clutch pressure) when the directional control valve is maintained at the cut-off position in case of 4L range wherein the transmission is loaded heavier.

8 Claims, 10 Drawing Sheets

HYDRAULIC-PRESSURE CONTROL SYSTEM FOR FOUR-WHEEL DRIVE VEHICLE WITH HYDRAULIC-PRESSURE OPERATED TRANSFER CLUTCH

BACKGROUND OF THE INVENTION

1. Field of the Invention

The present invention relates to a hydraulic-pressure control system for a four-wheel drive vehicle equipped with a hydraulic-pressure operated transfer clutch, and specifically to techniques for controlling a hydraulic pressure supplied to a transfer clutch for the purpose of optimally adjusting a driving-torque distribution between front and rear drive wheels.

2. Description of the Prior Art

Recently, there have been proposed and developed various driving-torque distribution control system for four-wheel drive vehicles in which a part of driving torque can be delivered from primary or main drive wheels, such as rear drive wheels to secondary or auxiliary drive wheels, such as front drive wheels by means of a transfer, depending on the difference of revolution speeds between front and rear drive wheels. One such driving-torque distribution control system has been disclosed in Japanese Patent Provisional Publication (Tokkai Heisei) No. 2-270641. In the Japanese Patent Provisional Publication No. 2-270641, the driving-torque control system is exemplified in case of a four-wheel drive vehicle in which rear drive wheels serve as primary drive wheels whereas front drive wheels serve as secondary drive wheels. In the above-noted prior art system, the greater the difference of revolution speeds between rear and front drive wheels, (i.e., the greater the slip ratio of the rear drive wheels), the greater the engaging force of the transfer clutch, so as to increase the driving-torque distribution ratio of the front drive wheels to the rear drive wheels, thus effectively and rapidly suppressing wheel slip (often called acceleration slip) at the rear drive wheels (the primary drive wheels). The prior art driving-torque control system utilizes a hydraulic circuit as shown in FIG. 11, for controlling the engaging force of the transfer clutch.

Referring now to FIG. 11, working fluid (hydraulic oil) in an oil reservoir 1 is pressurized by way of a hydraulic pump 2. The pressurized working fluid is supplied a supply line of the hydraulic circuit as a line pressure $P_L$. The line pressure $P_L$ is decreasingly regulated at a predetermined pressure level by means of a line-pressure regulation valve 3, and fed to a clutch-pressure control valve 4. The clutch-pressure control valve 4 is hydraulically connected to a duty-ratio controlled electromagnetic solenoid valve 5, for decreasingly adjusting the incoming line pressure $P_L$ in response to a controlled pressure output from the duty-ratio controlled solenoid valve 5 and based on a duty ratio imparted to the duty-ratio controlled solenoid valve 5, and for outputting a controlled clutch pressure $P_C$. The controlled clutch pressure $P_C$ is supplied via a pilot-operated directional control valve 6 to the transfer clutch 7. The pilot-operated directional control valve 6 is hydraulically connected to an electromagnetic directional control valve 8, such that the valve position of the valve 6 is selectively switched between two positions depending on the presence or absence of the external pilot pressure from the electromagnetic directional control valve 8, so as to enable or disable the supply of the clutch-pressure to the transfer clutch 7. If the valve 8 is de-energized, in the absence of the external pilot pressure from the valve 8, the fluid communication between the inlet port of the valve 6 and the inlet port of the transfer clutch 7 is blocked and also the inlet port of the valve 6 is communicated with a drain port connected to the reservoir, and as a result the transfer clutch 7 is released and thus the vehicle is operated at the two-wheel drive mode (the rear-wheel drive mode). If the electromagnetic directional control valve 8 is energized, and thus the external pilot pressure is output from the valve 8 to the valve 6, a full fluid communication between the inlet port of the valve 6 and the inlet port of the transfer clutch 7 is established. In this case, the higher the clutch pressure $P_C$, the greater the engaging force of the transfer clutch 7, and thereby increase the driving-torque distribution ratio of the secondary drive wheels (the front drive wheels) with respect to the primary drive wheels (the rear drive wheels). On the other hand, the duty-ratio controlled solenoid valve 5 is associated with the clutch-pressure control valve 4, so that the clutch pressure $P_C$ is decreasingly adjusted in accordance with the increase in the duty ratio applied to the duty-ratio controlled solenoid valve 5. For instance, with the duty ratio held at 0%, the clutch-pressure control valve 4 is maintained at its full-open position, thus permitting the incoming line pressure $P_L$ to be output from the clutch-pressure control valve 4 as a maximum secondary pressure (the maximum clutch pressure). In case of selection of a two-wheel drive range or mode, the electromagnetic directional control valve 8 and the duty-ratio controlled solenoid valve 5 are maintained at their de-energized positions, thus shutting off the flow of working fluid of the maximum clutch pressure from the clutch-pressure control valve 4 to the transfer clutch 7 by means of the pilot-operated directional control valve 6. In the prior art system as disclosed in the Japanese Patent Provisional Publication No. 2-270641, the clutch pressure $P_C$ in the outlet port of the clutch pressure control valve 4 can be maintained at a high pressure level in the case of the two-wheel drive mode, and thus the prior art system can quickly switch from the two-wheel drive mode to the four-wheel drive mode with a high response. Also, the conventional system can provide such a fail-safe function that the clutch pressure $P_C$ can be reliably fed from the clutch pressure control valve 4 to the pilot-operated directional control valve 6, even in case of breaking of a signal line through which a duty-cycle controlled exciting current is supplied to the solenoid of the duty-ratio controlled solenoid valve 5. Also in case of a four-wheel drive vehicle which can operate at a selected one of three modes, namely a four-wheel-drive low-speed range (4L) in which the vehicle is held forcibly at a four-wheel drive state by way of a mechanical locking means, a four-wheel-drive high-speed range (4H) in which engine power is properly distributed between front and rear drive wheels via a transfer clutch, and a two-wheel-drive high-speed range (2H) as previously explained, when the four-wheel-drive low-speed range is selected, the electromagnetic directional control valve 8 and the duty-ratio controlled solenoid valve 5 are both de-energized, and thus the supply of the clutch pressure $P_C$ is stopped in the same manner as the two-wheel-drive range. In this case, the switching operation from the two-wheel-drive range 2H or the four-wheel-drive low-speed range 4L to the four-wheel-drive high-speed range 4H can be quickly achieved.

Each of the above-noted pilot-operated directional control valve 6 and the clutch-pressure control valve 4 traditionally comprises a spool valve that slidably accommodates a spool in a cylindrical valve housing. The spool is biased in a normal position by way of a return spring. The position of the spool is controlled by a controlled pressure acting on a pressure receiving surface of the spool in the opposite direction to the direction of action of the spring bias, so as to produce a properly regulated secondary pressure. The prior art system suffers from the drawback, undesirable oil leakage via an annular aperture defined between the cylindrical sliding surface of a land of the spool and the inner wall surface of the valve housing, in presence of a great pressure difference between oil passages upstream of and downstream of the annular aperture. For example, in case of the pilot-pressure operated directional control valve 6, in the event that the electromagnetic directional control valve 8 is de-activated, the spool of the valve 6 is maintained at the spring-biased position (corresponding to the normal position) as seen in FIG. 12. In FIGS. 12 and 13, the broken lines indicate a return spring. In FIGS. 11, 12, and 13, X denotes a drain port. Under this condition, even though the inlet port of the valve 6 is shut off by way of the right-hand side land (viewing FIG. 12), a part of working fluid of a high clutch pressure Pc may be leaked via a slight annular aperture defined between the outer peripheral surface of the right-hand side land and the inner wall surface of the valve housing. As can be appreciated, the higher clutch pressure Pc supplied into the inlet port of the valve 6, the greater the oil leakage to the drain port. In case of the clutch pressure control valve 4, when the duty-ratio controlled solenoid valve 5 is de-energized, the maximum increased external pilot pressure is supplied from the valve 5 to the pilot port of the clutch-pressure control valve 4. As appreciated from FIGS. 11 and 13, the external pilot pressure acts on the right-hand side land (viewing FIG. 13) in the same direction as the direction of spring bias and thus the spool of the valve 4 is maintained at its leftmost position, thereby reducing a throttling rate of the line-pressure inlet port of the valve 4 at the minimum by means of the left-hand side land. Therefore, with the duty-ratio controlled solenoid valve 5 de-activated, the working fluid of a pressure level essentially equal to the incoming line pressure is output from the outlet port of the valve 4 as a clutch pressure Pc. As appreciated, when the clutch pressure Pc is adjusted toward the maximum clutch pressure in accordance with the increase in the external pilot pressure produced by the duty-ratio controlled solenoid valve 5, a greatly increased pressure difference takes place between oil passages upstream of and downstream of the annular aperture defined between the outer peripheral surface of the right-hand side land (shutting off the drain port) and the inner wall surface of the valve housing. Undesired oil leakage via the annular aperture to the drain port may result from the above-noted great pressure difference. As is generally known, in modern four-wheel drive automobiles with a driving-torque control system as discussed previously, a hydraulic circuit for a transfer clutch is often communicated with a hydraulic circuit used for lubricating an automatic transmission, so as to effectively deliver a portion of superfluous working fluid to the lubricating system of the transmission. For example, as a result of regulation of the line pressure, superfluous working fluid is traditionally delivered to the lubricating system for use in the transmission. The previously-noted increase in oil leakage in the hydraulic circuit for the transfer clutch may result in a short supply of lubricating oil to be supplied to the lubricating system. Particularly in case of the four-wheel-drive low-speed range 4L, there is a tendency for the transmission to be loaded heavier in comparison with the two-wheel-drive high-speed range 2H. Therefore, when the four-wheel-drive low-speed range 4L is selected and thus the supply of the clutch pressure Pc is stopped, the problem lacking lubricating oil is not negligible.

SUMMARY OF THE INVENTION

Accordingly, it is an object of the present invention to provide an improved hydraulic-pressure control system for a four-wheel drive vehicle equipped with a hydraulic-pressure operated transfer clutch that avoids the foregoing disadvantages of the prior art.

It is a principal object of the present invention to provide a hydraulic-pressure control system for a four-wheel drive vehicle with a hydraulic-pressure operated transfer clutch that can reduce oil leakage to a minimum in the absence of output of clutch pressure to the transfer clutch.

In order to accomplish the aforementioned and other objects of the invention, the first aspect of the invention is a hydraulic-pressure control system is for a four-wheel drive vehicle with a hydraulic-pressure operated transfer clutch, which is responsive to a controlled clutch pressure applied thereto to distribute a driving torque passing from a transmission between main drive wheels and auxiliary drive wheels. The system comprises a pilot-operated directional control valve fluidly disposed in a hydraulic pressure supply line and connected to the transfer clutch, and responsive to a first external pilot pressure. This valve is operable between a first valve position where a supply of hydraulic fluid for producing the controlled clutch pressure to the transfer clutch is cut off and a second valve position where hydraulic fluid for producing the controlled clutch pressure is directed to the transfer clutch. The system also has a clutch pressure control valve fluidly disposed in the hydraulic pressure supply line, upstream of the pilot-operated directional control valve. The clutch pressure control valve is responsive to a second external pilot pressure for producing the controlled clutch pressure essentially proportional to the second external pilot pressure. The system further includes a duty-ratio controlled valve for outputting the second external pilot therefrom to the pressure clutch pressure control valve and for decreasingly adjusting the second external pilot pressure in accordance with an increase in a duty ratio. The system also includes control means for forcibly outputting a duty-cycle controlled exciting current of a predetermined high duty ratio to the duty-ratio controlled valve to reduce the controlled clutch pressure to a low pressure level when the pilot-operated directional control valve is maintained at the first valve position.

According to another aspect of the invention, the system comprises the pilot-operated directional control valve, the clutch pressure control valve, and the duty-ratio controlled valve, as described above in the first aspect of the invention. The duty-ratio controlled valve here is electromagnetic solenoid operated. The system further includes an electromagnetic solenoid directional control valve, which is being responsive to a first exciting current, for shifting from a de-activated position to an activated position, and for outputting the first external pilot pressure to the pilot-operated directional control valve only when the electromagnetic solenoid directional control valve is maintained at the activated position. The system further includes control means for generating both the first exciting current for the electromagnetic solenoid type directional control valve and a second exciting current for the duty-ratio controlled electromagnetic solenoid valve, and for forcibly outputting the second exciting current of a predetermined high duty ratio to the duty-ratio controlled electromagnetic solenoid valve when the pilot-operated directional control valve is maintained at the first valve position depending on absence of the first exciting current to the electromagnetic solenoid type directional control valve. Preferably, the controlled clutch pressure may be decreasingly adjusted at a minimum clutch pressure when the second exciting current of the predetermined high duty ratio is output to the duty-ratio controlled electromagnetic solenoid valve.

According to a further aspect of the invention, a hydraulic-pressure control system is for a four-wheel drive vehicle with a hydraulic-pressure operated transfer clutch, which vehicle is selectively operable among a four-wheel-drive low-speed range where a propeller shaft of main drive wheels is mechanically coupled with a propeller shaft of auxiliary drive shafts, a four-wheel-drive high-speed range where a driving torque passing from a transmission is distributed between the main drive wheels and the auxiliary drive wheels depending on a controlled clutch pressure applied to the transfer clutch, and a two-wheel-drive range where the driving torque passing from the transmission is delivered only to the auxiliary drive wheels. This system comprises the pilot-operated directional control valve and the electromagnetic solenoid directional control valve as described above. This system further includes an electromagnetic valve means responsive to a control signal for generating the second external pilot pressure essentially inversely-proportional to a signal value of the control signal and control means for controlling a supply of the exciting current to shift the electromagnetic solenoid directional control valve to the de-activated position by absence of the exciting current to hold the pilot-operated directional control valve at the first valve position when one of the two-wheel-drive range and the four-wheel-drive low-speed range is selected. The control means is also for controlling a signal value of the control signal so that the control signal is set at a signal value equivalent to a predetermined pressure less. than a maximum clutch pressure when the four-wheel-drive low-speed range is selected and so that the control signal is set at a signal value equivalent to the maximum clutch pressure when the two-wheel-drive range is selected. The predetermined pressure is set at a minimum clutch pressure. The electromagnetic valve means may comprise a duty-ratio controlled electromagnetic solenoid valve, and the control signal from the control means may comprise a duty-cycle controlled exciting current of a duty ratio, and the second external pilot pressure generated from the duty-ratio controlled electromagnetic solenoid valve is decreasingly adjusted in accordance with an increase in the duty ratio so that the clutch pressure is decreasingly adjusted in accordance with the increase in the duty ratio. It is preferable that the control means outputs the duty-cycle controlled exciting current of a duty ratio of 100% when the four-wheel-drive low-speed range is selected, and outputs the duty-cycle controlled exciting current of a duty ratio of 0% when the two-wheel-drive range is selected.

According to a still further aspect of the invention, a hydraulic-pressure control system is for a four-wheel drive vehicle with a hydraulic-pressure operated transfer clutch, which is responsive to a controlled clutch pressure applied thereto to distribute a driving torque passing from a transmission between main drive wheels and auxiliary drive wheels, the control system being fluidly connected to a lubricating system for the transmission to deliver a part of superfluous hydraulic fluid in the control system to the lubricating system. This system also comprises the pilot-operated directional control valve, the clutch pressure control valve, the duty-ratio controlled valve, and the control means, as described above in the first aspect of the invention. The control means, however, is also for forcibly outputting a duty-cycle controlled exciting current of a predetermined high duty ratio to the duty-ratio controlled valve to reduce the controlled clutch pressure to a low pressure level when the directional control valve means is maintained at the first valve position and additionally when the transmission is loaded heavier.

DESCRIPTION OF THE PREFERRED EMBODIMENTS

Figure 1:
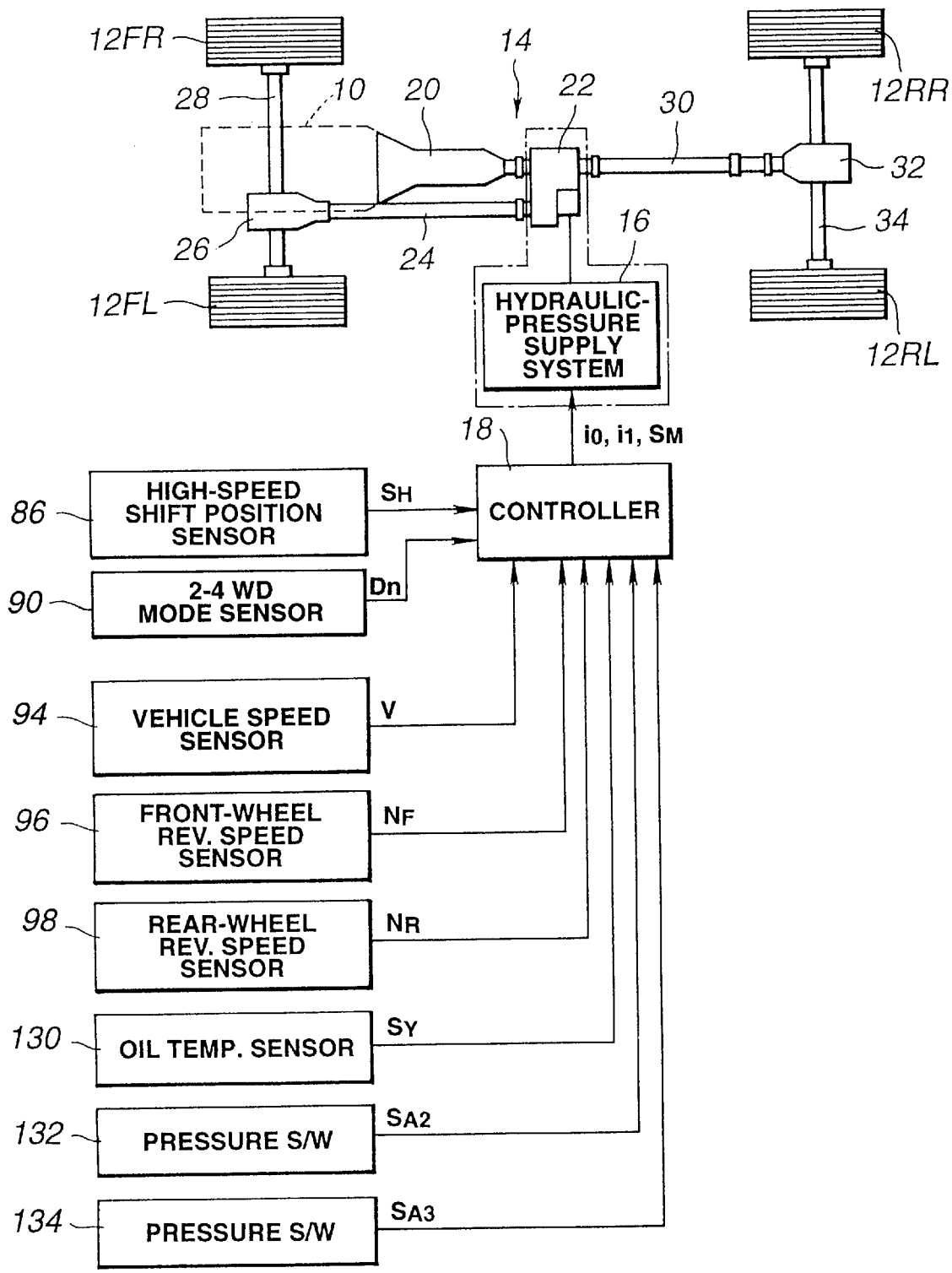
FIG. 1 is a schematic system diagram illustrating a transfer hydraulic-pressure control system of the invention.

Referring now to the drawings, particularly to FIG. 1, the hydraulic-pressure control system made according to the present invention is exemplified in a front-engine four-wheel drive vehicle, normally operating in a basic drive mode corresponding to a rear-wheel drive mode, in which the engine power (a driving torque, produced by the engine 10 serving as a prime mover, and passing from an automatic transmission 20 to a transfer case 40) is all delivered to rear road wheels 12RL and 12RR. Each of the front road wheels 12FL and 12FR is connected to a front differential 26 by means of front drive shafts 28, while each of the rear road wheels 12RL and 12RR is connected to a rear differential 32 by means of rear drive shafts 34. Reference numeral 30 denotes a rear propeller shaft connected to the rear differential 32. The four-wheel drive vehicle includes a power train 14 by means of which a driving-torque distribution ratio between the front (12FL; 12FR) and rear (12RL; 12RR) drive wheels is changeable. As seen in FIG. 1, the power train 14 includes the automatic transmission 20 transmitting the engine power at a selected gear ratio and a transfer 22 having a transfer clutch 66 and a chain 72 transmitting the power delivered by a transfer clutch 66 accommodated in the transfer 22 to a front propeller shaft 24. A hydraulic pressure supply system 16 is provided to supply a clutch pressure Pc to the transfer 22 of the power train 14. The four-wheel-drive control system of the invention also includes a controller 18.

Figure 2:
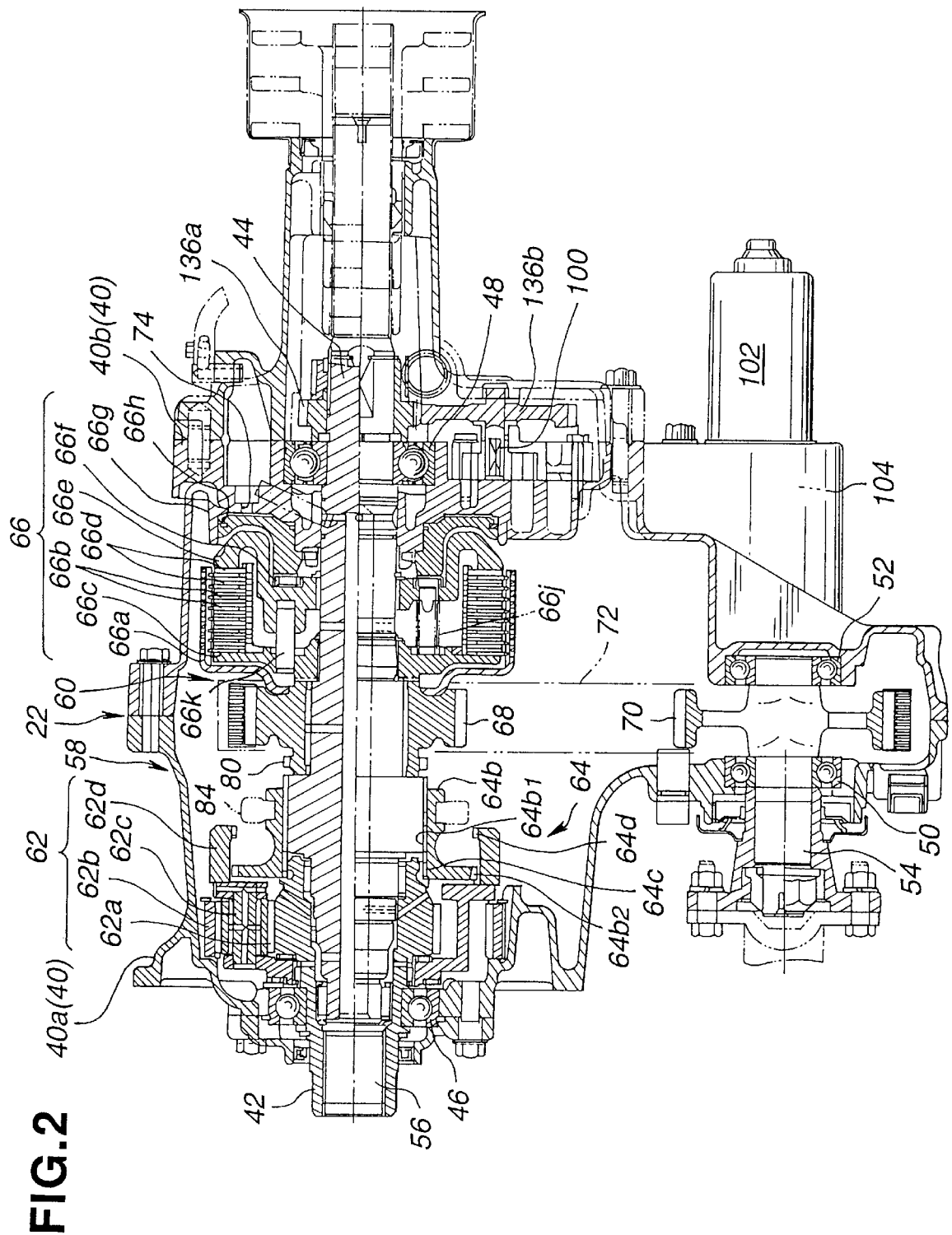
FIG. 2 is a longitudinal cross-sectional view illustrating an internal structure of a transfer employed in the system of the embodiment.
Figure 3:
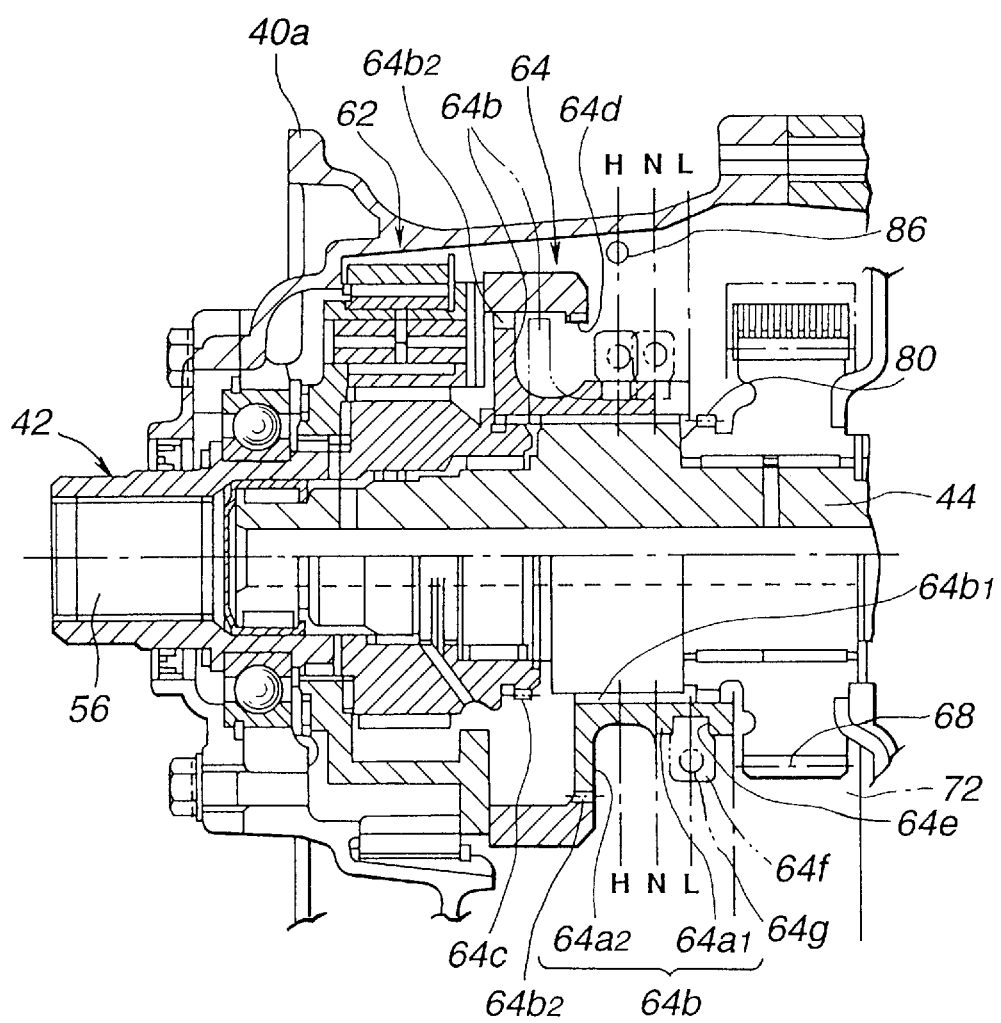
FIG. 3 is a partially enlarged cross-sectional view illustrating the interior of the transfer employed in the system of the embodiment.

Referring now to FIG. 2, there is shown a detailed internal structure of the transfer 22. The transfer 22 includes an input shaft 42 and a first output shaft 44, both rotatably disposed in the transfer casing 40 and coaxially arranged with each other. The input shaft 42 is rotatably supported in the front transfer casing 40a by way of a radial bearing 46, while the first output shaft 44 is rotatably supported in the rear transfer casing 40b by way of a radial bearing 48. The output shaft 42 is separated from the first output shaft 44 to ensure a relative rotation between the two shafts 42 and 44. The transfer 22 also includes a second output shaft 54 rotatably supported by means of a pair of radial bearings 50 and 52, so that the central axis of the second output shaft 54 is parallel with the central axis of the first output shaft 44. As seen in FIG. 2, the bearing 50 is firmly fitted to the front transfer casing 40a, while the bearing 52 is firmly fitted to the rear transfer casing 40b. The input shaft 42 is firmly connected to the output shaft 56 of the transmission 20 to receive the power passing through the transmission, the first output shaft 44 is connected to the rear propeller shaft 30 through a universal joint (not numbered), and the second output shaft 54 is connected to the front propeller shaft 24 through a universal joint (not numbered). The transfer 22 includes a sub-gearchange mechanism 58 and a two-wheel-drive/four-wheel-drive switching mechanism 60. As seen in FIG. 2, the two mechanisms 58 and 60 are operably provided on the outer periphery of the input shaft 42 and the first output shaft 44. The sub-gearchange mechanism 58 comprises a planetary-gear mechanism 62 and a dog-clutch type high-speed/low-speed switching mechanism 64, coaxially arranged with each other. As seen in FIG. 2, the planetary-gear mechanism 62 is comprised of a sun gear 62a formed on the outer periphery of the input shaft 42, an internal gear 62b firmly fitted into the inner peripheral wall of the front transfer casing 40a, a planet-pinion gear 62c in meshed engagement with both the sun gear 62a and the internal gear 62b, and a pinion carrier 62d rotatably supporting the pinion gear 62c. On the other hand, the high-speed/low-speed switching mechanism 64 is comprised of a shift sleeve 64b, a high-speed shift gear 64c, and a low-speed shift gear 64d. The shift sleeve 64b has a substantially cylindrical portion 64a1 formed with an internal toothed portion 64b1 and a flanged portion 64a2 formed with an external toothed portion 64b2. The shift sleeve 64b is splined to a plurality of key grooves formed on the outer periphery of the first output shaft 44 by means of the internal toothed portion 64b1, so that the shift sleeve 64b is slidable in its axial direction. As seen in FIG. 3, the shift sleeve 64b is formed with a substantially annular outer peripheral groove 64e at its cylindrical portion 64a1. A fork 64g is engaged with the groove 64e. Reference numeral 64f denotes a fork rod integrally formed with the fork 64g. The fork rod 64f is mechanically linked through a linkage (not shown) to a gearchange lever of the sub-gearchange mechanism 58 by way of which lever the two-wheel-drive high-speed shift position H (2H range), the four-wheel-drive high-speed shift position H (4H range), the neutral position N (N range), and the four-wheel-drive low-speed shift position L (4L range) can be selected in that order, for example. The high-speed shift gear 64c is formed on the outer periphery of the input shaft 42 so that the shift gear 64c is brought into meshed engagement with the internal toothed portion 64b1 by way of a leftward axial sliding movement (viewing FIG. 3) of the shift sleeve 64b. As indicated by the solid line in the upper half of FIG. 3, when selecting 2H range or 4H range by the sub-gearchange lever, that is, when the shift sleeve 64b moves to the high-speed shift position H (the leftmost position), the high-speed shift gear 64c comes into meshed engagement with the internal toothed portion 64b1. In the high-speed shift position H, the driving torque transmitted to the input shaft 42 is transferred directly to the first output shaft 44. The low-speed shift gear 64d is formed on the inner periphery of the pinion carrier 62d so that the shift gear 64d is brought into meshed engagement with the external toothed portion 64b2 by way of a rightward axial sliding movement of the shift sleeve 64. As indicated by the phantom line in the lower half of FIG. 3, when the shift sleeve 64b is shifted from the high-speed shift position H through the neutral position N to the low-speed shift position (the rightmost position), the low-speed shift gear 64d comes into meshed engagement with the external toothed portion 64b2 and additionally the internal toothed portion 64b1 is engaged with an additional gear 80 of a first sprocket 68 described later. As indicated by the phantom line in the upper half of FIG. 3, when the shift sleeve 64b is held at the neutral position N substantially midway between the high-speed shift position H and the low-speed shift position L, the shift sleeve 64b is held in the disengaged state in which the internal toothed portion 64b1 is disengaged from the high-speed shift gear 64c and also the external toothed portion 64b2 is disengaged from the low-speed shift gear 64d. The sliding motion of the shift sleeve 64b is produced by way of the fork 64g. In FIG. 3, only the end of the fork 64g is shown.

Returning to FIG. 2, the two-wheel-drive/four-wheel-drive switching mechanism 60 includes a wet multiple-disc friction clutch 66, called the transfer clutch, the first sprocket 68, the second sprocket 70 and the chain 72. As seen in FIG. 2, the part-time four-wheel drive vehicle employing the transfer 22 equipped with the transfer clutch 66 is generally known as an "active torque-split four-wheel drive vehicle". In such an active torque-split four-wheel drive vehicle, a distribution ratio of driving torque of front wheels to rear wheels is actively controlled by variably adjusting an engaging force of the transfer clutch 66 via a controlled clutch pressure Pc produced by the hydraulic pressure supply system 16 detailed later. The first sprocket 68 is rotatably supported on the first output shaft 44. The second sprocket 70 is fixedly connected to the second output shaft 54 so that the second sprocket 70 and the second output shaft 54 are coaxially arranged with each other. The second sprocket 70 has a driven connection with the first sprocket 68 through the chain 72. The transfer clutch 66 includes a clutch drum 66a fixedly connected to the first sprocket 68, a plurality of friction plates 66b splined to the clutch drum 66a, a clutch hub 66c splined onto the outer periphery of the first output shaft 44, a plurality of friction disks 66d integrally connected onto the clutch hub 66c and interleaved with the friction plates 66b, a rotary member 66e disposed close to the outer periphery of the first output shaft 44 for frictional contact between the friction plates 66b and the friction disks 66d, a guide pin 66k connected integral with the clutch hub 66c for ensuring the axial sliding motion of the rotary member 66e, a clutch piston 66g slidably accommodated in a cylinder chamber 66h defined in the inner wall portion of the rear transfer casing 40b for causing the above-mentioned frictional contact, a thrust bearing 66f interleaved between the rotary member 66e and the clutch piston 66g for transmitting the axial sliding motion of the piston 66g to the rotary member 66e, and a return spring 66j biasing the rotary member 66e toward the clutch piston 66g.

Figure 6:
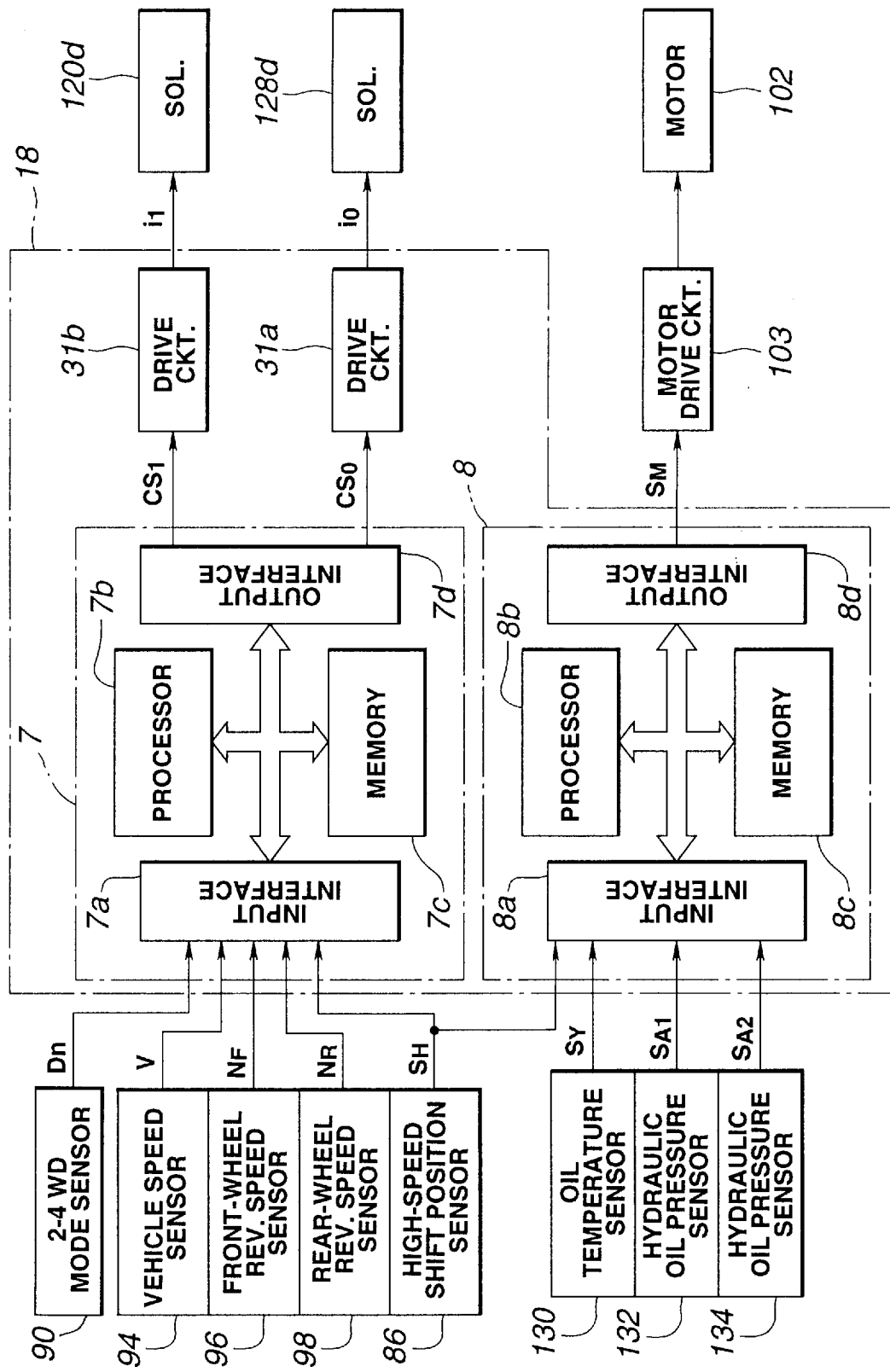
FIG. 6 is a block diagram illustrating a controller employed in the system of the embodiment.

The clutch pressure Pc from hydraulic pressure supply system 16 is fed into an inlet port 74 formed in the rear transfer casing 40b and communicates with the cylinder chamber 66h. When the hydraulic pressure of the cylinder chamber 66h is increased owing to the incoming clutch pressure Pc, the clutch piston 66g moves leftward (viewing FIG. 2). The leftward sliding motion of the clutch piston 66g is transmitted through the thrust bearing 66f to the rotary member 66e and thus the friction disks 66d abut the friction plates 66b, with the result that the friction plates 66b come into frictional contact with the friction disks 66d. The degree of the frictional engagement, i.e., the magnitude of the clutch engaging force is dependent on the incoming clutch pressure Pc. In this manner, the driving torque passing from the first output shaft 44 can be transmitted through the first sprocket 68, the chain 72 and the second sprocket 70 to the second output shaft 54, at a desired driving-torque distribution ratio depending on the engaging force of the transfer clutch 66. In contrast to the above, owing to the decreased clutch pressure Pc, when the rotary member 66e and the clutch piston 66g are placed at their rightmost positions (viewing FIG. 2) by way of the bias of the return spring 66j, the friction plates 66b are held in axially spaced relationship with the friction disks 66d, and thus the power coming from the first output shaft 44 is not transmitted to the second output shaft 54. As seen in FIG. 2, the first sprocket 68 is integrally formed with an additional external gear 80, called a four-wheel-drive gear, which is engageable with the internal toothed portion 64b1 of the shift sleeve 64b. The additional gear 80 is designed to be meshed with the internal toothed portion 64b1, simultaneously when the shift sleeve 64b moves to the low-speed shift position L shown in FIG. 3 and the external toothed portion 64b2 of the shift sleeve 64b is meshed with the low-speed shift gear 64d of the pinion carrier 62d. That is, the shift sleeve 64b and the additional gear 80 are cooperative with each other to construct a dog clutch through which the first output shaft 44 is mechanically and forcibly coupled with the second output shaft 54 at the low-speed shift position L. As previously described, the shift sleeve 64b is moved axially from one of the high-speed shift position H, the neutral position N, and the low-speed shift position L to the other, through the fork 64g by manually operating the sub-gearchange lever (not shown). As seen in FIG. 3, a high-speed shift position sensor 86 is provided to detect that the shift sleeve 64b is shifted to the high-speed shift position H, and to generate a high-speed shift position indicative signal SH representing that the shift sleeve 64b is held at the high-speed shift position H. As seen in FIG. 6, the signal SH is input into the controller 18, as explained later.

Figure 4:
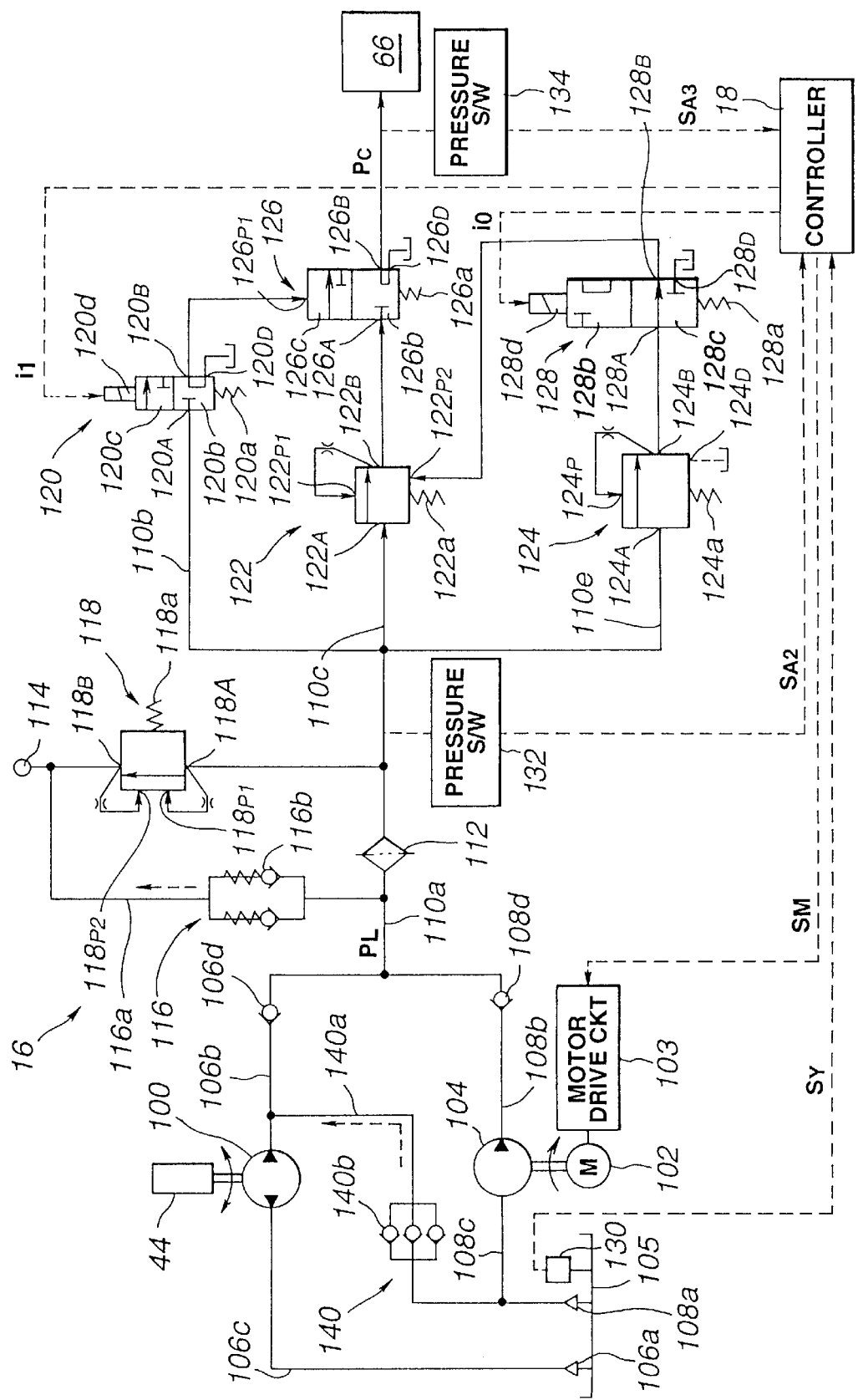
FIG. 4 is a block diagram illustrating a hydraulic-pressure supply circuit of the system of the embodiment.

Referring now to FIG. 4, there is shown a detail of the hydraulic pressure supply system 16. The hydraulic pressure supply system 16 includes a two-directional flow type reversible pump 100 having a driven connection with the input shaft 42 connected to the output shaft 56 of the transmission 20, and a single directional flow type hydraulic oil pump 104 arranged in parallel with the pump 100 and having a driven connection with an electric motor 102. The former pump 100 will be hereinafter referred to as a "main pump", while the latter pump 104 will be hereinafter referred to as a "sub-pump". The sub-pump 104 is provided to function as an auxiliary oil pressure source, in the event that there is less line pressure produced by the main pump 100. As seen in FIG. 4, the main pump 100 suctions working fluid (hydraulic oil) from an oil reservoir 105 through an oil strainer 106a and an oil suction line 106c, and feeds the clean hydraulic oil to an oil delivery line 106a, while the sub-pump 104 suctions hydraulic oil from the reservoir 105 through another oil strainer 108a and an oil suction line 108c, and feeds the clean hydraulic oil to an oil delivery line 108a. Each strainer is provided to prevent dirt and other large particles from entering the pump. A check valve 106d is fluidly disposed in the oil delivery line 106b to prevent back flow of the hydraulic oil to the outlet port of the main pump 100. Similarly, a check valve 108d is fluidly disposed in the oil delivery line 108b to prevent back flow of the hydraulic oil to the outlet port of the sub-pump 104. The two oil delivery lines 106b and 108b are converged to a sole oil supply line 110a. An oil element 112 is fluidly disposed in the oil supply line 110a to remove any impurities from the incoming oil. Upstream of the oil element 112, the oil supply line 110a is fluidly connected to an inlet port of a relief oil passageway 116. The outlet port of the relief oil passageway 116 communicates an oil lubricating system 114 mainly used for lubrication of the transmission 20. Downstream of the oil element 112, the oil supply line 110a is connected to a line-pressure regulating valve 118. The line-pressure regulating valve 118 is provided to regulate the pressurized hydraulic oil passing from the oil supply line 110a to a predetermined line pressure PL. The oil supply line 110a is divided into three branch lines, namely a first branch line 110b connected to an inlet port of an electromagnetic solenoid type directional control valve 120, a second branch line 110c connected to an inlet port of a clutch pressure control valve 122, and a third branch line 110e connected to an inlet port of a pressure reducing valve 124. The outlet port of the clutch pressure control valve 122 is connected to the inlet port of an external pilot-operated directional control valve 126. The outlet port of the pilot-operated directional control valve 126 is connected to the inlet port 74 of the transfer casing to supply the clutch pressure Pc to the transfer clutch 66 in response to a pilot pressure based on a control signal i1 produced by the controller 18. On the other hand, the outlet port of the pressure reducing valve 124 is connected to the inlet port of a duty-ratio controlled electromagnetic solenoid valve 128, which supplies an external pilot pressure to the clutch pressure control valve 122. Reference numeral 130 denotes an oil temperature sensor provided in the oil reservoir 105 for detecting a temperature of working fluid. Reference numeral 132 denotes a hydraulic pressure switch connected to the oil supply line 110a just before the junction of the supply line 110a and the branch lines (110b; 110c; 110e), for detecting the hydraulic oil pressure decreasingly regulated by the line-pressure regulating valve 118. Reference numeral 134 denotes a hydraulic pressure switch connected to a clutch pressure delivery line communicating the outlet port of the pilot-operated directional control valve 126, for detecting the clutch pressure Pc to be delivered to the transfer clutch 66. In the shown embodiment, main parts constructing the oil pressure supply system 16 are disposed in the transfer 22. As seen in FIG. 2, the main pump 100 is provided in the vicinity of the radial bearing 48 so that the main pump 100 is driven by the first output shaft 44 by means of a first gear 136a and a second gear 136b. On the other hand, the sub-pump 104 is connected to the electric motor 102 attached to the outside wall of the transfer casing (transfer rear casing 40b). In FIG. 4, a by-pass circuit 140 is fluidly disposed between the oil delivery line 106b of the main pump 100 and the oil suction line 108c of the sub-pump 104. The by-pass circuit 140 includes a bypass line 140a and three check valves 140b being parallel to each other and fluidly disposed in the bypass line 140a. The by-pass circuit 140 is provided to supply the hydraulic oil from the suction line 108c to the delivery line 16b in the direction indicated by the broken line with the three check valves 140b opened, when the hydraulic pressure in the delivery line 106b is reduced substantially to vacuum.

Figure 5:
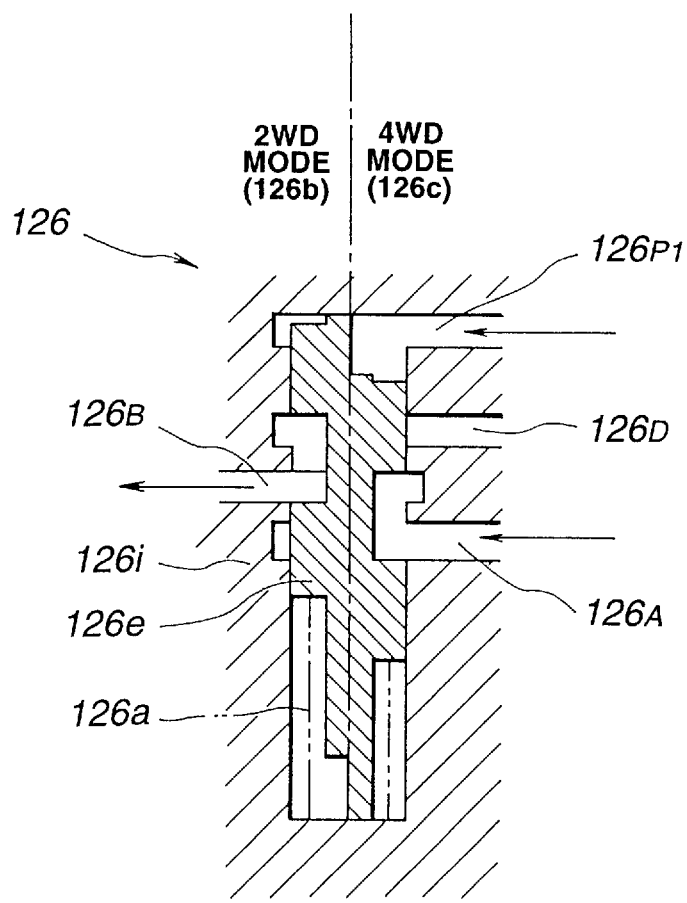
FIG. 5 is a longitudinal cross-sectional view explaining the operation of a pilot-operated switching valve assembled in the hydraulic-pressure supply circuit shown in FIG. 4.

The relief oil passageway 116 includes a relief line 116a disposed between the upstream line of the oil element 112 and the inlet of the oil lubricating system 114, and a pair of spring-loaded ball check valves 116b, set in parallel. The relief oil passageway 116 acts to relieve the high-pressure hydraulic oil to the lubricating system 114 with the check valves opened in the direction indicated by the broken line, when the pressure level of the pressurized hydraulic oil exceeds a predetermined high-pressure level just upstream of the oil element 112, owing to clogging of the element 112. As seen in FIG. 4, the line pressure regulating valve 118 consists of an internal-pilot operated, spring-offset type pressure reducing valve. The line pressure regulating valve 118 has an inlet port 118A connected to the supply line 110a, an outlet port 118B connected to the inlet of the lubricating system 114, a first internal pilot port 118P1 receiving a primary pressure thereinto through a fixed orifice, a second internal pilot port 118P2 receiving a secondary pressure from the outlet port 118B thereinto through a fixed orifice, a spool slidably disposed in the valve housing of the pressure regulating valve 118, and a return spring 118a biasing the spool in one axial direction. Also, supplied to the lubricating system 114 is the superfluous hydraulic oil discharged from the outlet port 118B of the line pressure regulating valve 118 after regulating the pressurized hydraulic oil passing through the supply line 110a at a predetermined pressure level such as 6.3 kgf/cm$^2$. The clutch pressure control valve 122 consists of an internal- and external-pilot operated, spring-offset pressure regulating valve. The clutch pressure control valve 122 includes an inlet port 122A connected to the branch line 110c, an outlet port 122B connected to the inlet of the pilot operated directional control valve 126, an internal pilot port 122P1 receiving a secondary pressure from the outlet port 122B thereinto through a fixed orifice as a pilot pressure, an external pilot port 122P2 receiving a controlled pressure generated by the duty-ratio controlled electromagnetic solenoid valve 128, a spool slidably disposed in the valve housing of the clutch pressure control valve 122, and a return spring 122a biasing the spool to one axial direction. The clutch pressure control valve 122 is responsive to the controlled pressure (the external pilot pressure) generated from the duty-ratio controlled solenoid valve 128, in such a manner as to establish a full fluid communication between the inlet and outlet ports 122A and 122B in the presence of the controlled pressure generated from the solenoid valve 128. The secondary pressure discharged from the outlet port 122B of the pressure control valve 122 is output to the directional control valve 126 as a clutch pressure Pc. In contrast, in the absence of the controlled pressure to be generated from the solenoid valve 128, the pressure control valve 122 operates to block the fluid communication between the inlet and outlet ports 122A and 122B. The pressure reducing valve 124 consists of an internal-pilot operated, spring-offset, constant secondary-pressure type pressure reducing valve. The pressure reducing valve 124 includes an inlet port 124A connected to the branch line 110e, an outlet port 124B connected to the inlet of the duty-ratio controlled solenoid valve 128, an internal-pilot port 124P receiving a secondary pressure from the outlet port 124B thereinto through a fixed orifice, a drain port 124D, and a spool slidably disposed in the valve housing of the reducing valve 124, and a return spring 124a biasing the spool to one axial direction. By way of a proper sliding movement of the spool, based on the pilot pressure (the secondary pressure from the outlet port 124B) fed into the pilot port 124P, the primary pressure coming from the inlet port 124A is decreasingly adjusted to a proper decreased pressure level. The properly reduced hydraulic pressure is supplied from the pressure reducing valve 124 to the inlet port 128A of the duty-ratio controlled solenoid valve 128. The duty-ratio controlled electromagnetic solenoid valve 128 consists of a three-port, two-position electromagnetic solenoid valve. The duty-ratio controlled solenoid valve 128 includes the inlet port connected to the outlet port 124B of the pressure reducing valve 124, a drain port 128D, an outlet port 128B connected to the external-pilot port 122P2 of the clutch pressure control valve 122, a spool slidably disposed in the valve housing of the solenoid valve 128, a return spring 128a biasing the spool to one axial direction, and an electromagnetic solenoid 128d. The solenoid valve 128 is so designed that its valve position is switchable between a normal position 128c (a spring-biased position) where a fluid communication between the inlet and outlet ports 128A and 128B is established and a solenoid-actuated position 128b where a fluid communication between the outlet port 128B and the drain port 128D is established in lieu of the fluid communication between the two ports 128A and 128B. The solenoid valve 128 is responsive to a desired duty-cycle controlled exciting current i0 supplied from the controller 18 in the form of a rectangular pulse signal having a duty cycle determined by the controller. As is generally known, in case of the duty-ratio controlled solenoid valve, a high-level exciting current and a low-level exciting current are repeatedly supplied to the solenoid 128d at a desired duty cycle determined by the controller 18, with the result that the ratio of a time duration of the valve closed state and a time duration of the valve open state is desirably controlled in accordance with the duty ratio and thus the controlled pilot pressure output from the solenoid valve 128 to the clutch. pressure control valve 122 can be varied depending on the duty ratio. In more detail, the controlled pilot pressure generated from the solenoid valve 128 is decreasingly adjusted, as the duty ratio D is increased. That is, the solenoid valve 128 is so designed to generate the controlled pilot pressure of a pressure level essentially inversely-proportional to a signal value of the control signal CS0. With the duty ratio of 0%, when the solenoid valve 128 is held at the spring-biased position or the normal position 128c shown in FIG. 4, the controlled pilot pressure reaches its maximum pressure level, and as a result the clutch pressure control valve 122 is maintained at its full-open position and thus the line pressure PL (the primary pressure) is directly output as the clutch pressure Pc (the secondary pressure). Conversely, with the duty ratio D of 100%, the solenoid valve 128 is periodically and frequently maintained at the solenoid-actuated position 128b. As a result, the pilot pressure from the solenoid valve 128 is reduced at the minimum and thus the clutch pressure control valve 122 is maintained at the maximum pressure-reduction position. In this case, the clutch pressure Pc can be regulated at the minimum pressure level such as 1 kgf/cm$^2$. In this manner, the pressure level of the clutch pressure Pc generated from the pressure control valve 122 can be suitably adjusted depending on the controlled pilot pressure fed into the pilot port 122P2. Depending on the pressure level of the clutch pressure Pc adjusted, the engaging force of the transfer clutch 66 is also adjusted properly. That is, the driving-torque distribution ratio of the front wheels to the rear wheels is determined by the clutch pressure Pc, i.e., the duty-cycle controlled exciting current i0 produced by the controller 18. The spring-offset type electromagnetic directional control valve 120 consists of a three-port, two-position electromagnetic solenoid valve. The directional control valve 120 includes an inlet port 120A connected to the branch line 110*b*, an outlet port 120B connected to the external pilot port 126P1 of the pilot-operated directional control valve 126, a drain port 120D, a spool slidably disposed in the valve housing of the directional control valve. 120, a return spring 120*a* biasing the spool to one axial direction, and an electromagnetic solenoid 120*d*. The directional control valve 120 is so designed that its valve position is switchable between a normal position 120*b* where a fluid communication between the outlet port 120B and the drain port 120D is established and a solenoid-actuated position 120*c* where a fluid communication between the inlet and outlet ports 120A and 120B is established and the fluid communication between the outlet port 120B and the drain port 120D is blocked. Note that the directional control valve 120 is controlled by an ON-OFF control but not the above-noted duty-ratio control. That is, the directional control valve 120 is activated or de-activated in response to a current level of the exciting current $i_1$ generated from the controller 18 to the solenoid 120*d*. When the current $i_1$ of a comparatively high current level is supplied to the solenoid 120*d*, the valve 120 is activated and thus its valve position is shifted to the solenoid-activated position 120*c* to establish the fluid communication between the inlet and outlet ports 120A and 120B. Under this condition, the line pressure $P_L$ is supplied through the directional control valve 120 to the external pilot port 126P1 of the pilot-operated directional control valve 126. When the low-current or less current $i_1$ is supplied to the solenoid 120*d*, the valve 120 is de-activated and thus its valve position is held at the normal position 120*b* to block the fluid communication between the two ports 120A and 120B. Under this condition, the hydraulic oil supplied to the pilot port 126P1 is quickly drained through the drain port 120D to the reservoir to extinguish the pilot pressure applied to the pilot-operated directional control valve 126. As seen in FIGS. 4 and 5, the pilot-operated directional control valve 126 consists of a three-port, two-position spring-offset type spool valve. The spool valve 126 includes an inlet port 126A connected to the outlet port 122B of the clutch pressure control valve 122, an outlet port 126B connected to the inlet port 74 of the transfer clutch 66, an external pilot port 126P1 connected to the outlet port 120B of the directional control valve 120, a drain port 126D, a spool 126*e* slidably disposed in the valve housing 126*i* of the spool valve 126, and a return spring 126*a* biasing the spool 126*e* to one axial direction (the uppermost position in FIG. 5). In the absence of the pilot pressure to be supplied into the external pilot port 126P1, as shown in the left half of FIG. 5, the spool 126*e* is held at the uppermost position (a 2WD-mode position 126*b*) by way of the bias of the spring 126*a*, with the result that a fluid communication between the inlet and outlet ports 126A and 126B is blocked and the outlet port 126B is communicated with the drain port 126D, that is, there is no supply of the clutch pressure $P_C$ to the transfer clutch 66. Conversely, when the solenoid 120*d* of the directional control valve 120 is activated by the exciting current $i_1$ of a high-current level, and thus the pilot pressure is supplied via the valve 120 to the external pilot port 126P1, as shown in the right half of FIG. 5, the spool 126*e* is shifted to the lowermost position (a 4WD-mode position 126*c*) against the bias of the spring 126*a* by way of the pilot pressure introduced into the pilot port 126P1, with the result that a fluid communication between the inlet and outlet ports 126A and 126B is established, that is, the clutch pressure $P_C$ based on the duty ratio determined by the controller 18 is supplied through the pilot-operated directional control valve 126 to the transfer clutch 66.

A mode-select switch or a 2–4WD mode sensor 90 is also provided in the vicinity of the driver seat of the vehicle, for selecting the drive mode of the four-wheel drive vehicle. In more detail, the mode-select switch 90 is provided to switch one of three modes to another. A first mode corresponds to the previously-discussed two-wheel-drive high-speed range 2H where the power (driving torque) is all delivered to the rear wheels, a second mode corresponds to the previously-discussed four-wheel-drive high-speed range 4H where the driving torque distribution of the front wheels to the rear wheels is variably adjustable among 0% to 50%, depending on the wheel revolution-speed difference $\Delta N$ between the front and rear wheels, and a third mode corresponds to the previously-discussed four-wheel-drive low-speed range 4L where the first output shaft 44 is mechanically coupled with the second output shaft 54 and the vehicle is in a so-called rigid four-wheel-drive state and thus the driving torque distribution is maintained at 50%. Depending on the selected mode, the mode-select switch 90 selectively switches either one of a two-wheel-drive mode selection signal D2, a four-wheel-drive high-speed mode selection signal D4H and a four-wheel-drive low-speed mode selection signal D4L at a high signal level (an ON state). For example, when the two-wheel-drive mode 2H is selected, the signal D2 is changed at a high signal level (an ON state), and the other signals D4H and D4L are held at a low signal level (an OFF state). These selection signals D2, D4H and D4L are input into the controller 18. A front-wheel revolution-speed sensor 96 is provided at the second output shaft 54 for detecting revolution speeds of the second output shaft 54. In the shown embodiment, the front-wheel revolution-speed sensor 96 essentially corresponds to an auxiliary drive wheel revolution-speed sensor which detects a mean revolution-speed of the auxiliary drive wheels (the front-left and front-right wheels 12FL and 12FR). On the other hand, a rear-wheel revolution-speed sensor 98 is provided at the input shaft 42 of the sub-gearchange mechanism 58 for detecting revolution speeds of the input shaft 42. The rear-wheel revolution-speed sensor 98 essentially corresponds to a main drive wheel revolution-speed sensor which detects a mean revolution-speed of the main drive wheels (the rear-left and rear-right wheels 12RL and 12RR). The controller 18 receives the high-speed shift position indicative signal S_H from the high-speed shift position sensor 86, the mode selection signal Dn (n=2H, 4H, 4L) from the mode-select switch 90, the vehicle-speed indicative signal V from a vehicle speed sensor 94, the front-wheel revolution-speed indicative signal N_F from the sensor 96 and the rear-wheel revolution-speed indicative signal N_R from the sensor 98. Ordinarily used as the rear-wheel revolution-speed sensor 98 is a revolution-speed sensor usually attached to the output shaft of the automatic transmission for detecting revolution speeds of the output shaft 56 of the automatic transmission so as to provide one of various parameters required for automatically controlling the automatic transmission.

Returning to FIG. 1, the controller 18 also receives an oil temperature indicative signal S_Y from the oil temperature sensor 130, a line-pressure indicative signal S_{A2} from the pressure switch 132 and a clutch pressure indicative signal S_{A3} from the pressure switch 134. As hereinafter described in detail, the controller 18 generates the above-noted exciting currents $i_0$ and $i_1$, based on the signals S_H, Dn (n=2H,4H, 4L), V, N_F and N_R. On the basis of the signals S_Y, S_{A2} and S_{A3}, the controller 18 generates a motor control signal S_M to execute a line-pressure hold control according to which the line pressure $P_L$ is maintained constant, as appreciated from FIG. 4.

Referring now to FIG. 6, there is shown a detailed structure of the controller 18 including a microcomputer 7 provided for the driving-torque distribution control, another microcomputer 8 provided for the above-noted line-pressure hold control for the line pressure PL, a drive circuit 31a responsive to a control signal CS0 from the microcomputer 7 for outputting the exciting current i0 correlated to the duty ratio D determined for the solenoid 128d of the duty-ratio controlled electromagnetic valve 128, a drive circuit 31b responsive to a control signal CS1 from the microcomputer 7 for outputting the exciting current i1 to the solenoid 120d of the directional control valve 120, and a motor drive circuit 103 that adjusts a rotational speed of the motor 102 by way of chopping control, depending on the control signal SM produced by the microcomputer 8 and based on a control parameter, such as a vehicle speed. Actually, the microcomputer 8 is responsive to the vehicle speed in order to output the control signal SM to the motor drive circuit 103 for subsidiarily driving the motor 102 having a driving connection with the sub-pump 104, and thus ensuring a predetermined line pressure PL, in the event that, on the basis of the signal from the hydraulic pressure switch 132, the controller 18 determines that a hydraulic oil pressure of the pressurized working fluid produced by the main pump 100 is insufficient. In more detail, the microcomputer 8 executes the line-pressure hold control when the line pressure PL detected by pressure switch 132 is below a predetermined pressure level, in such a manner as to determine the magnitude of the control signal SM on the basis of both the vehicle speed and the oil temperature indicative signal SY from the sensor 130, and to properly control the rotational speed of the sub-motor 102, thereby maintaining the line pressure PL at a predetermined pressure level. If the clutch pressure PC detected by the pressure switch 134 is held at an excessively low pressure level such as zero and additionally the high-speed shift position indicative signal SH is output from the high-speed shift position sensor 86, the microcomputer 8 operates to generate a warning signal indicating that the pilot-operated directional control valve 126 malfunctions.

As seen in FIG. 6, the microcomputer 7 consists of an input interface 7a, such as an input interface circuit, an arithmetic processor 7b, a memory 7c, such as a read only memory (ROM) and a random access memory (RAM), and an output interface 7d, such as an output interface circuit. Actually, the input interface 7a receives the signals Dn, V, NF, NR and SH, while the output interface 7d outputs the control signal CS0 to the drive circuit 31a so as to output the duty-cycle controlled exciting current i0 to the solenoid 128d, and also outputs the control signal CS1 to the drive circuit 31b so as to output the ON/OFF signal i1 to the solenoid 120d. Actually, the control signal CS0 is an analog voltage signal representative of the duty ratio D correlated with a target driving torque ΔT delivered to the front wheels 12FL and 12FR, which target torque is determined by the arithmetic processor 7b in accordance with a predetermined arithmetic processing (See FIG. 10) on the basis of the signals Dn, V, NF, NR and SH. For the above reasons, the drive circuit 31a includes a pulse-width modulator for modulating the control signal CS0 consisting of the analog signal to the duty-cycle controlled exciting current i0 of the determined duty ratio D. The memory 7c memorizes predetermined characteristics illustrated in FIGS. 7 to 9 in the form of data map. The memory 7c also stores a program necessary for the control procedure executed by the arithmetic processor 7b and temporarily stores results of calculation, obtained through the control routine shown in FIG. 10.

Figure 7:
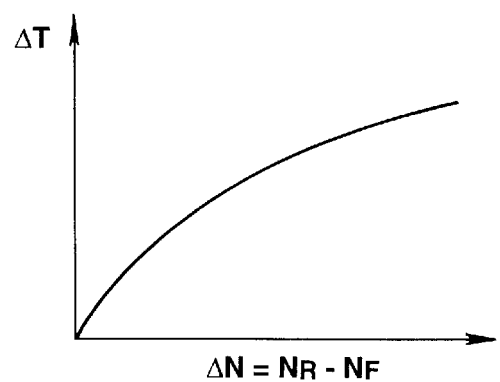
FIG. 7 is a graph illustrating a relationship between a front-and-rear wheel revolution-speed difference ΔN and a wheel-speed difference dependent driving torque ΔT to be delivered to the front axle.

Referring to FIG. 7 there is shown the front-and-rear wheel speed difference ΔN versus wheel-speed difference dependent front-wheel side driving torque ΔT (corresponding to the target torque delivered to the front axle) characteristic. As can be appreciated from the characteristic curve indicated in FIG. 7, the target torque delivered to the front wheels increases in a non-linear fashion in accordance with an increase in the wheel speed difference ΔN=(NR−NF).

Figure 8:
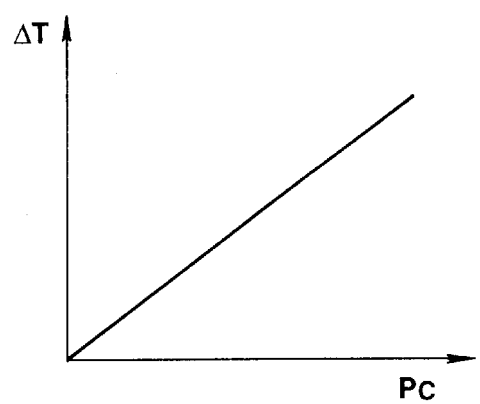
FIG. 8 is a graph illustrating a relationship between a clutch pressure Pc and the driving torque ΔT.

Referring to FIG. 8, there is shown the clutch pressure PC versus target torque ΔT characteristic. As seen in FIG. 8, the target torque to be delivered to the front wheels is varied in a linear fashion in accordance with an increase in the clutch pressure PC.

Figure 9:
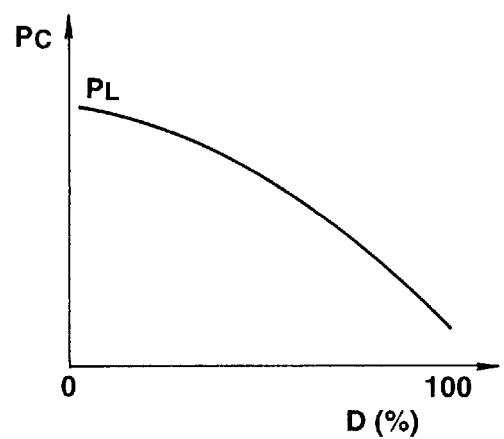
FIG. 9 is a graph illustrating a relationship between a duty ratio D and the clutch pressure Pc.

Referring to FIG. 9, there is shown the duty ratio D versus clutch pressure PC characteristic. As appreciated from the characteristic, the clutch pressure PC is varied in a non-linear fashion i.e., essentially in a parabolic fashion. Actually, the clutch pressure PC decreases non-linearly in accordance with the increase in the duty ratio D. As can be appreciated from FIGS. 7 to 9, the distribution ratio of driving torque of the front wheels to the rear wheels can be adjusted within a range of 0: 100% to 50%: 50%. Where the duty ratio D is less than the minimum duty ratio, the clutch 66 is held at its clutch stand-by state in which less clutch pressure and thus there is no transmission of driving torque through the friction plates 66b and the friction disks 66d in excessively light contact.

On the other hand, the microcomputer 8 consists of an input interface 8a such as an input interface circuit, an arithmetic processor 8b, a memory 8c such as a read only memory (ROM) and a random access memory (RAM), and an output interface 8d such as an output interface circuit. The input interface 8a receives the signals SY, SA2 and SA3 for converting these signals to digital signals, while the output interface 8d has a digital-to-analog conversion function to output the control signal SM to the motor drive circuit 103.

Figure 10:
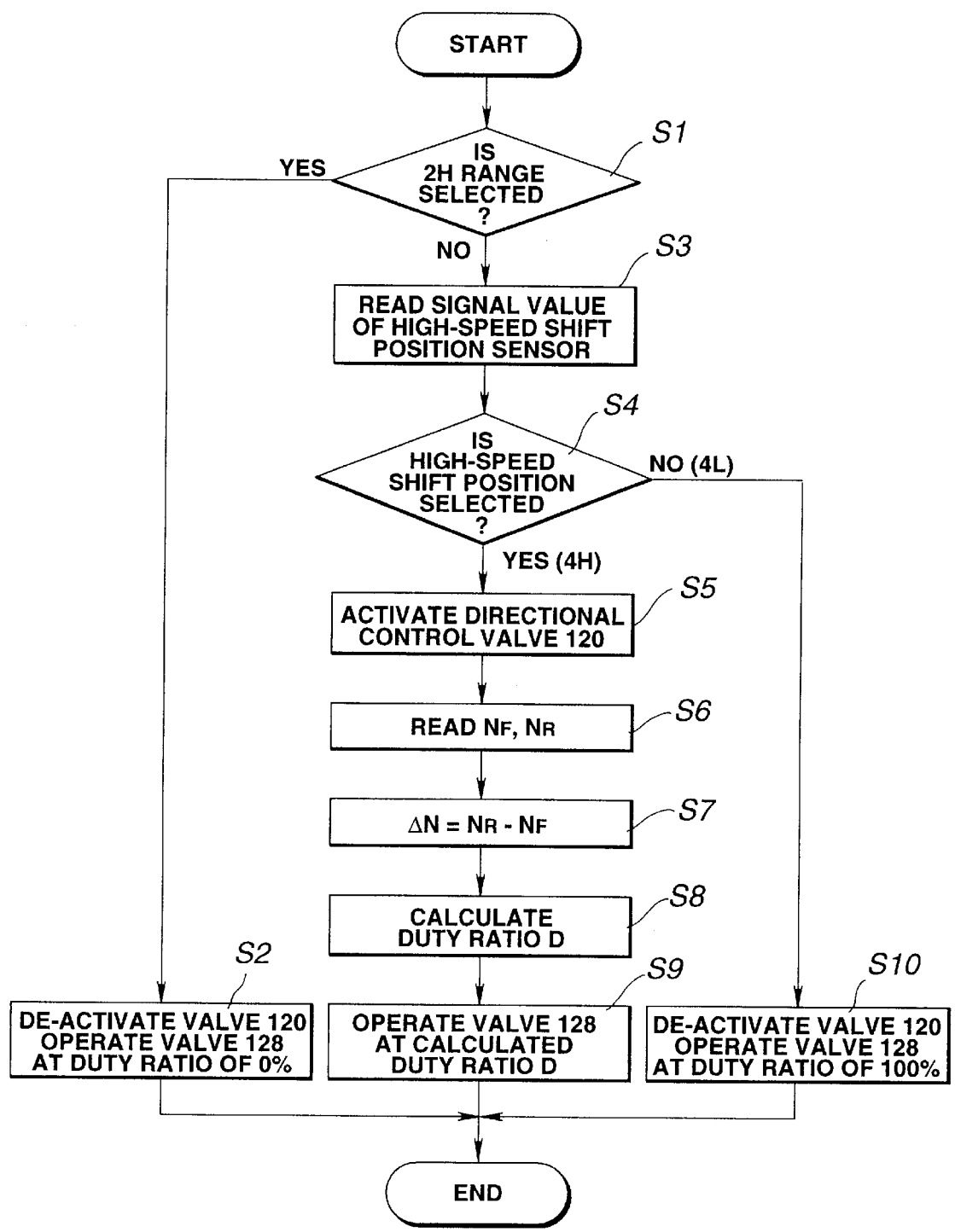
FIG. 10 is a flow chart illustrating a procedure of a transfer hydraulic-pressure supply control executed by the system of the embodiment.
Figure 11:
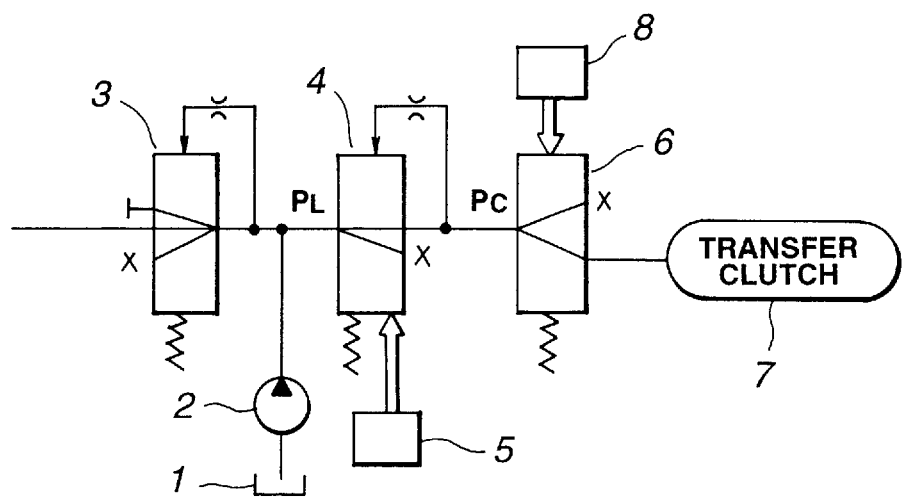
FIG. 11 is a block diagram illustrating a prior art hydraulic-pressure supply circuit for a transfer clutch.
Figure 12:
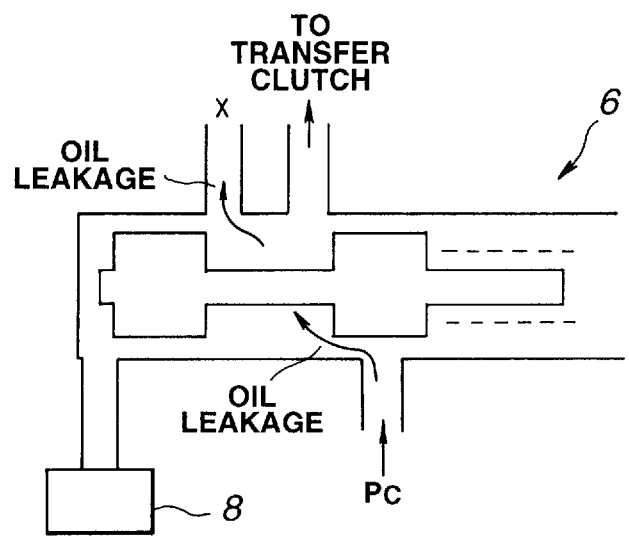
FIG. 12 is a schematic illustration explaining oil leakage from a spool of a pilot-operated directional control valve in the prior art system.
Figure 13:
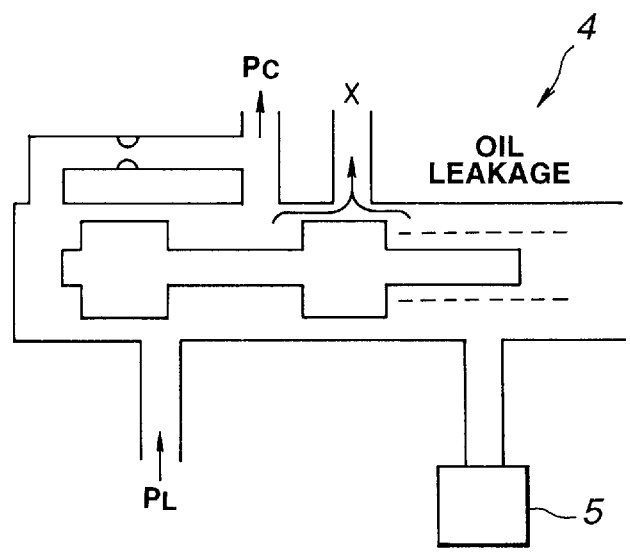
FIG. 13 is a schematic illustration explaining oil leakage from a spool of a clutch pressure control valve in the prior art system.

According to the arithmetic processing indicated in FIG. 10. the microcomputer 7 calculates the duty ratio D related to the clutch pressure PC on the basis of the high-speed shift position indicative signal SH from sensor 86, the mode selection signal Dn from the mode select switch (2–4WD mode sensor) 90, the vehicle-speed indicative signal V from the sensor 94, the front-and-rear wheel speed difference ΔN derived from the front-wheel revolution-speed indicative signal value NF and the rear-wheel revolution-speed indicative signal value NR. In accordance with the flow from step S1 through steps S3, S4, S5, S6, S7 and S8 to step S9 as illustrated in FIG. 10, the microcomputer 7 outputs the control signals CS0 and CS1 basically depending on the duty ratio D based on these signals SH, Dn, V and ΔN. Concretely, the microcomputer 7 derives the target torque ΔT on the basis of the wheel speed difference ΔN in accordance with the characteristic curve indicated in FIG. 7 and derives a target clutch pressure PC from the derived target torque ΔT in accordance with the predetermined data map indicated in FIG. 8 and finally derives a target duty ratio D. from the derived target clutch pressure PC in accordance with the predetermined data map indicated in FIG. 9. In this case, the engaging force of the clutch 66, i.e., the torque distribution ratio of the front wheels to the rear wheels can be variably adjusted in response to variations in the duty ratio D. As appreciated from the flow chart of FIG. 10, the system of the invention can provide another flow from step S1 to step S2 and provide another flow from step S4 to step S10, in addition to the above-noted flow from step S1 through steps S3, S4, S5, S6, S7 and S8 to step S9. Hereinbelow detailed is the control procedure shown in FIG. 10.

In step S1, a test is made to determine on the basis of the mode selection signal Dn from the mode-select switch (2–4WD mode sensor) 90 whether or not the two-wheel-drive high-speed shift position (2H range) is selected. When the answer to step S1 is affirmative (YES), i.e, when 2H range is selected, step S2 proceeds in which the control signal CS0 to be output to the duty-ratio controlled electromagnetic solenoid valve 128 is set at a minimum signal level such as zero, whereas the control signal CS1 to be output to the electromagnetic solenoid type directional control valve 120 is set at a low signal level for example zero. In this case, with the control signal CS0 of the minimum signal level or with the duty ratio D of 0%, the clutch pressure control valve 122 is maintained at its full-open position and thus the clutch pressure Pc is set at the maximum pressure level (equivalent to the line pressure PL). On the other hand, with the control signal CS1 of the low signal level, the directional control valve 120 is held at the normal position 120b and thus the pilot-operated directional control valve 126 is held at the 2WD-mode position 126b, so that there is no supply of the clutch pressure Pc to the transfer clutch 66. In comparison with the four-wheel-drive low-speed range 4L, in case of 2H range, oil leakage in the directional control valve 126 may be negligible because of the lighter loaded transmission. As set forth above, in the case that 2H range is selected, the drive mode can be quickly shifted from the two-wheel-drive mode to the four-wheel-drive mode with a high response, since the clutch pressure Pc is adjusted to the predetermined maximum pressure level. Since the solenoid 128d is actually de-energized in 2H range, undesired power consumption can be avoided. In 2H range, even if it will become impossible to supply the exciting current i0 to the solenoid 128d of the valve 128 owing to damage to the supply line of the current i0, the drive mode can be certainly switched from the two-wheel-drive mode to the four-wheel-drive mode, because of the clutch pressure Pc maintained at the predetermined maximum pressure level. For example, when it becomes impossible to supply the exciting current i0 to the solenoid 128d when shifting from 2H range to 4H range, the drive mode can be reliably shifted from the two-wheel-drive mode to the four-wheel-drive mode, even though the front-and-rear wheel driving-torque distribution ratio is fixed at a constant ratio such as 50%: 50%.

On the other hand, when the answer to step S1 is negative (NO), i.e., when either the four-wheel-drive high-speed shift position (4H range) or the four-wheel-drive low-speed shift position (4L range) is selected, step S3 proceeds in which the signal value of the signal SH from the high-speed shift position sensor 86 is read.

In step S4, a test is made to determine whether the shift sleeve 64b is shifted to the high-speed shift position H, that is, the high-speed shift position indicative signal SH from the sensor 86 is maintained at a high signal level. In other words, in the presence of the high-speed shift position indicative signal SH, the controller determines that4H range (the four-wheel-drive high-speed shift position) is selected. In such a case, the control procedure flows from step S4 to step S5.

In step S5, the control signal CS1 is set at a high signal level and thus the directional control valve 120 is activated or energized to shift the valve position to the solenoid-actuated position 120c, and then the line pressure PL is supplied directly to the pilot port 126P1 of the pilot-operated directional control valve 126 as a pilot pressure, and as a result, the pilot-operated directional control valve 126 is maintained at the 4WD-mode position 126c where it is possible to supply the clutch pressure Pc to the transfer clutch 66.

In step S6, the front-wheel revolution-speed indicative signal NF from the sensor 96 and the rear-wheel revolution-speed indicative signal NR from the sensor 98 are read.

In step S7, the front-and-rear wheel speed difference ΔN is calculated in accordance with the expression (ΔN=NR−NF).

In step S8, the duty ratio D is calculated and derived on the basis of the characteristics (data maps) shown in FIGS. 7, 8 and 9.

In step S9, the control signal CS0 of a signal value correlated to the calculated duty ratio D is output to the drive circuit 31a for the solenoid 128d and thus the duty-ratio controlled electromagnetic valve 128 is operated at the calculated duty ratio D. As a result, the pilot pressure based on the calculated duty ratio D is output to the clutch pressure control valve 122 and thus the clutch pressure Pc based on the pilot pressure from the valve 128 is supplied through the fully-opened pilot-operated directional control valve 126 (See step S5) to the transfer clutch 66. In this manner, the engaging force of the transfer clutch 66 is controlled depending upon the calculated duty ratio D. For instance, under a condition of a less front-and-rear wheel speed difference ΔN, since it is unnecessary to deliver a part of the driving torque of the rear drive wheels to the front drive wheels, the duty ratio D is adjusted to approximately 100%. With the duty ratio controlled at approximately 100%, the pilot pressure output from the valve 128 is set at almost zero, thus maintaining the clutch pressure control valve 122 essentially at its maximum pressure-reduction position. As a result, the clutch pressure Pc output from the valve 122 is regulated at the minimum pressure level such as 1 kgf/cm$^2$ and then the engaging force of the transfer clutch 66 is adjusted to a minimum value. The driving torque transmitted from the first output shaft 44 through the transfer clutch 66 to the first sprocket 68 becomes approximately zero and thus the vehicle is operated essentially at the two-wheel drive mode (the rear-wheel drive mode) owing to less transmission of driving torque to the front drive wheels. In contrast to the above, the duty ratio D is decreasingly adjusted, as the front-and-rear wheel speed difference ΔN gradually increases. With the duty ratio D decreasingly adjusted, the clutch pressure Pc output from the valve 122 increases, and thus the engaging force of the transfer clutch 66 is increased. As a result, a part of the driving torque of the rear drive wheels is delivered from the first output shaft 44 through the transfer clutch 66, the first sprocket 68, the chain 72, the second sprocket 70, the second output shaft 54, the front propeller shaft 24, the front differential 26 and the front drive shafts 28 to the front-left and front-right road wheels 12FL and 12FR, shifting the drive mode to the four-wheel-drive mode. As set forth above, in the four-wheel-drive high-speed shift position (4H range), in accordance with the increase in the front-and-rear wheel speed difference ΔN, that is, the decreasing adjustment of the duty ratio D, the driving-torque distribution ratio of the front drive wheels to the rear drive wheels can be varied from 0: 100% to 50%: 50%.

Under a traveling condition where 4H range is selected through the gearchange lever of the sub-gearchange mechanism 58, where the vehicle tends to be stuck in the mud or in the sands, the driver usually shifts from 4H range to 4L range. First of all, the driver shifts the shift lever to N range or to P range, and then shifts the lever of the sub-gearchange mechanism 58 from 4H range to 4L range. In accordance with such a series of shifting operations, the internal toothed portion 64b1 of the shift sleeve 64b is brought into meshed engagement with the gear 80 of the first sprocket 68, so that the shift sleeve 64b can be moved from the high-speed shift position H to the low-speed shift position L.

Returning to step S4, in the absence of the high-speed shift position indicative signal SH, the controller determines that 4L range is selected, and then the control procedure flows from step S4 to step S10. Under the condition where the four-wheel-drive low-speed shift position (4L range) is selected by the sub-gearchange lever, the driving torque output from the automatic transmission 20 is transmitted into the input shaft 42 of the transfer 22, and the output speed is reduced by the sub-gearchange mechanism 58 kept in the 4L range and in lieu thereof the output driving-torque is increased. A torque component of the increased driving-torque is transmitted through the low-speed shift gear 64d of the pinion carrier 62d, the external toothed portion 64b2 of the shift sleeve 64b and the internal toothed portion 64b1 of the shift sleeve 64b to the first output shaft 44. In addition, the remaining torque component of the increased driving torque is transmitted through the gear 80 engaged with the internal toothed portion 64b1 of the shift sleeve 64b, the first sprocket 68, the chain 72, and the second sprocket 70 to the second output shaft 54. In this manner, the driving torque transmitted into the input shaft 42 is forcibly distributed into the first and second output shafts 44 and 54, by way of the engagement between the low-speed shift gear 64d and the external toothed portion 64b2 and the engagement between the internal toothed portion 64b1 and the gear 80, and whereby the vehicle is operated in the so-called rigid four-wheel-drive state wherein the first output shaft 44 is mechanically coupled with the second output shaft 54. In the system of the present invention, in the case that the 4L range is selected, the procedure flows from step S4 to step S10 as previously described.

In step S10, the directional control valve 120 is de-activated with the control signal CS1 held at the low signal level and additionally the duty-ratio controlled electromagnetic solenoid valve 128 is operated at the maximum duty ratio of 100% with the control signal CS0 held at a maximum signal level. With the control signal CS1 held at the low signal level, the two directional control valves 120 and 126 are held at their normal positions 120b and 126b, and thus the supply of the clutch pressure PC to the inlet port of the transfer clutch 66 is stopped forcibly by means of the valve 126. Additionally, with the duty-ratio controlled solenoid valve 128 operated at the duty ratio of 100%, the pilot pressure from the valve 128 is adjusted at the minimum and as a result the clutch pressure PC is adjusted to the minimum pressure level such as 1 kgf/cm$^2$. As can be appreciated from the above, in the system of the present invention, since the valve 128 is actively operated at the duty ratio of 100% even when 4L range is selected and thus the clutch pressure PC is adjusted at the minimum pressure level, oil leakage in the pilot-operated directional control valve 126 can be suppressed to and reduced to the minimum owing to the clutch pressure PC adjusted at the minimum pressure level, and also oil leakage in the clutch pressure control valve 122 can be suppressed to and reduced to the minimum owing to the pilot pressure applied to the external pilot port 122P2 and adjusted to the minimum pressure level. In this manner, since oil leakage can be suppressed to the minimum even when 4L range is selected, the system of the invention can ensure a high lubrication performance required for the lubricating system 114.

As set out above, according to the system of the invention, when 2H range is selected, the control procedure flows from step S1 to step S2 in which the two control signals CS1 and CS0 are both set at the low signal level and the clutch pressure PC of the maximum pressure level is output from the clutch pressure control valve 122 to the pilot-operated directional control valve 126 held at its 2WD-mode position (the normal position) owing to the external pilot pressure generated from the valve 128 and set at the maximum pressure level. Therefore, there is a greatly increased tendency of oil leakage in the respective valves 122 and 126 in such a 2H range. However, in comparison with 4L range, the lubricating system 114 may require a relatively small amount of lubricating oil because of the transmission 20 is loaded lighter in case of 2H range, and thus the problem of oil leakage may be negligible in the 2H range. In addition, since the clutch pressure PC is kept at the maximum pressure level in the case of 2H range, the system can provide a high response when switching from 2H range to 4H range. Furthermore, when the duty-ratio controlled solenoid valve 128 is operated at the duty ratio of 0%, for example when the 2H range is selected, power consumption can be suppressed.

In the shown embodiment, although the duty-ratio controlled solenoid valve 128 is operated at the duty ratio of 0% in case of 2H range, and operated at the duty ratio of 100% in case of 4H range, it will be appreciated that a low duty ratio nearly equal to 0% may be used in lieu of 0% to provide a maximum clutch pressure and a high duty ratio nearly equal to 100% may be used in lieu of 100% to provide a minimum clutch pressure.

Although the system of the embodiment is applied to a four-wheel-drive vehicle that operates in a rear-wheel drive mode as a basic drive mode, as can be appreciated, the system of the present invention can be applied to a four-wheel-drive vehicle that operates in a front-wheel drive mode as a basic drive mode.

As will be appreciated from the above, in the hydraulic-pressure control system made according to the present invention, the duty-ratio controlled solenoid valve 128 can be operated forcibly at a comparatively high duty ratio such as 100% in a particular state where the supply of the clutch pressure PC to a hydraulic pressure operated transfer clutch is stopped, the clutch pressure PC is effectively reduced at a low pressure level and thus undesired oil leakage, which will occur in a clutch pressure control valve 122 and in a pilot-operated directional control valve 126 in the stopped state of the clutch-pressure supply, can be effectively reduced and suppressed, while insuring the clutch pressure PC even in case of breaking of a signal line through which a duty-cycle controlled exciting current i0 is supplied to the solenoid of the duty-ratio controlled solenoid valve 128. In the shown embodiment, since the clutch pressure PC is regulated at a predetermined minimum pressure level such as 1 kgf/cm$^2$ in the stopped state of the clutch-pressure supply, the above-noted suppressive effect of undesired oil leakage in the valves 122 and/or 126 is great.

As set forth above, the system of the embodiment takes much account of suppression of undesired oil leakage in valves employed in the hydraulic pressure supply system 16 employed in the control system in case of a four-wheel-drive low-speed range (4L range) where the heavier loaded transmission requires a great deal of lubricating oil that can be delivered as a part of superfluous working fluid in the hydraulic pressure supply system to the lubricating system of the transmission, and additionally takes much account of a high responsiveness of switching operation from a two-wheel-drive high-speed range (2H range) to a four-wheel-drive high-speed range (4H range) in case of the 2H range where the lighter loaded transmission requires less lubricating oil.

Moreover, in the system of the previously-explained embodiment in which the clutch pressure PC is adjusted to a low pressure level such as a predetermined minimum pressure level (e.g. 1 kgf/cm²) in case of 4L range and adjusted to a high pressure level (a predetermined maximum pressure level) in case of 2H range, and a duty-ratio controlled solenoid valve 128, outputting an external pilot pressure to a clutch pressure control valve 122, is designed to decreasingly adjust the clutch pressure Pc in accordance with the increase in the duty ratio D, since the clutch pressure Pc can be adjusted to the predetermined maximum pressure level when the duty ratio of 0% is selected, that is when the solenoid of the duty-ratio controlled solenoid valve 128 is deactivated, the predetermined maximum clutch pressure can be supplied to the transfer clutch to assure a four-wheel-drive mode even a signal line, through which a duty-cycle controlled exciting current i0 is supplied to the duty-ratio controlled solenoid valve 128 is broken.

While the foregoing is a description of the preferred embodiments carried out the invention, it will be understood that the invention is not limited to the particular embodiments shown and described herein, but that various changes and modifications may be made without departing from the scope or spirit of this invention as defined by the following claims.

What is claimed is:

1. A hydraulic-pressure control system for a four-wheel drive vehicle with a hydraulic-pressure operated transfer clutch, which is responsive to a controlled clutch pressure applied thereto to distribute a driving torque passing from a transmission between main drive wheels and auxiliary drive wheels, said system comprising:

a pilot-operated directional control valve fluidly disposed in a hydraulic pressure supply line and connected to said transfer clutch and responsive to a first external pilot pressure, the control valve being operable between a first valve position where a supply of hydraulic fluid for producing said controlled clutch pressure to said transfer clutch is cut off and a second valve position where hydraulic fluid for producing said controlled clutch pressure is directed to said transfer clutch;

a clutch pressure control valve fluidly disposed in said hydraulic pressure supply line and upstream of said pilot-operated directional control valve, and being responsive to a second external pilot pressure for producing said controlled clutch pressure essentially proportional to said second external pilot pressure;

a duty-ratio controlled valve for outputting said second external pilot pressure therefrom to said clutch pressure control valve and for decreasingly adjusting said second external pilot pressure in accordance with an increase in a duty ratio; and control means for forcibly outputting a duty-cycle controlled exciting current of a predetermined high duty ratio to said duty-ratio controlled valve to reduce said controlled clutch pressure to a low pressure level when said pilot-operated directional control valve is maintained at said first valve position.

2. A hydraulic-pressure control system for a four-wheel drive vehicle with a hydraulic-pressure operated transfer clutch, which is responsive to a controlled clutch pressure applied thereto to distribute a driving torque passing from a transmission between main drive wheels and auxiliary drive wheels, said system comprising:

a pilot-operated directional control valve fluidly disposed in a hydraulic pressure supply line and connected to said transfer clutch, and being responsive to a first external pilot pressure for switching from a first valve position where a supply of hydraulic fluid for producing said controlled clutch pressure to said transfer clutch is cut off to a second valve position where hydraulic fluid for producing said controlled clutch pressure is directed to said transfer clutch;

an electromagnetic solenoid directional control valve, responsive to a first exciting current, for shifting from a deactivated position to an activated position, and for outputting said first external pilot pressure to said pilot-operated directional control valve only when said electromagnetic solenoid directional control valve is maintained at said activated position;

a clutch pressure control valve fluidly disposed in said hydraulic pressure supply line and upstream of said pilot-operated directional control valve, and being responsive to a second external pilot pressure for producing said controlled clutch pressure essentially proportional to said second external pilot pressure;

a duty-ratio controlled electromagnetic solenoid valve for outputting said second external pilot pressure therefrom to said clutch pressure control valve and for decreasingly adjusting said second external pilot pressure in accordance with an increase in a duty ratio; and control means for generating both said first exciting current for said electromagnetic solenoid directional control valve and a second exciting current for said duty-ratio controlled electromagnetic solenoid valve, and for forcibly outputting said second exciting current of a predetermined high duty ratio to said duty-ratio controlled electromagnetic solenoid valve when said pilot-operated directional control valve is maintained at said first valve position depending on absence of said first exciting current to said electromagnetic solenoid directional control valve.

3. The hydraulic-pressure control system as set forth in claim 2, wherein said controlled clutch pressure is decreasingly adjusted at a minimum clutch pressure when said second exciting current of said predetermined high duty ratio is output to said duty-ratio controlled electromagnetic solenoid valve.

4. A hydraulic-pressure control system for a four-wheel drive vehicle with a hydraulic-pressure operated transfer clutch, which vehicle is selectively operable among a four-wheel-drive low-speed range where a propeller shaft of main drive wheels is mechanically coupled with a propeller shaft of auxiliary drive shafts, a four-wheel-drive high-speed range where a driving torque passing from a transmission is distributed between said main drive wheels and said auxiliary drive wheels depending on a controlled clutch pressure applied to said transfer clutch, and a two-wheel-drive range where said driving torque passing from said transmission is delivered only to said auxiliary drive wheels, said system comprising:

a pilot-operated directional control valve fluidly disposed in a hydraulic pressure supply line and connected to said transfer clutch, and being responsive to a first external pilot pressure for switching from a first valve position where a supply of hydraulic fluid for producing said controlled clutch pressure to said transfer clutch is cut off to a second valve position where hydraulic fluid for producing said controlled clutch pressure is directed to said transfer clutch;

an electromagnetic solenoid directional control valve, responsive to an exciting current, for shifting from a deactivated position to an activated position, and for outputting said first external pilot pressure to said pilot-operated directional control valve only when said electromagnetic solenoid directional control valve is maintained at said activated position;

a clutch pressure control valve fluidly disposed in said hydraulic pressure supply line and upstream of said pilot-operated directional control valve, and being responsive to a second external pilot pressure for producing said controlled clutch pressure essentially proportional to said second external pilot pressure;

electromagnetic valve means responsive to a control signal for generating said second external pilot pressure essentially inversely-proportional to a signal value of said control signal; and control means for controlling a supply of said exciting current to shift said electromagnetic solenoid directional control valve to said de-activated position by absence of said exciting current to hold said pilot-operated directional control valve at said first valve position when one of said two-wheel-drive range and said four-wheel-drive low-speed range is selected, said control means being also for controlling a signal value of said control signal so that said control signal is set at a signal value equivalent to a predetermined pressure less than a maximum clutch pressure when said four-wheel-drive low-speed range is selected, and so that said control signal is set at a signal value equivalent to said maximum clutch pressure when said two-wheel-drive range is selected.

5. The hydraulic-pressure control system as set forth in claim 4, wherein said predetermined pressure is set at a minimum clutch pressure.

6. The hydraulic-pressure control system as set forth in claim 5, wherein said electromagnetic valve means comprises a duty-ratio controlled electromagnetic solenoid valve, and said control signal from said control means comprises a duty-cycle controlled exciting current of a duty ratio, and said second external pilot pressure generated from said duty-ratio controlled electromagnetic solenoid valve is decreasingly adjusted in accordance with an increase in said duty ratio so that said clutch pressure is decreasingly adjusted in accordance with the increase in said duty ratio.

7. The hydraulic-pressure control system as set forth in claim 6, wherein said control means outputs said duty-cycle controlled exciting current of a duty ratio of 100% when said four-wheel-drive low-speed range is selected, and outputs said duty-cycle controlled exciting current of a duty ratio of 0% when said two-wheel-drive range is selected.

8. A hydraulic-pressure control system for a four-wheel drive vehicle with a hydraulic-pressure operated transfer clutch, which is responsive to a controlled clutch pressure applied thereto to distribute a driving torque passing from a transmission between main drive wheels and auxiliary drive wheels, said control system being fluidly connected to a lubricating system for said transmission to deliver a part of superfluous hydraulic fluid in said control system to said lubricating system, said control system comprising:

a pilot-operated directional control valve fluidly disposed in a hydraulic pressure supply line and connected to said transfer clutch and responsive to a first external pilot pressure, the control valve being operable between a first valve position where a supply of hydraulic fluid for producing said controlled clutch pressure to said transfer clutch is cut off and a second valve position where hydraulic fluid for producing said controlled clutch pressure is directed to said transfer clutch;

a clutch pressure control valve fluidly disposed in said hydraulic pressure supply line and upstream of said pilot-operated directional control valve, and being responsive to a second external pilot pressure for producing said controlled clutch pressure essentially proportional to said second external pilot pressure;

a duty-ratio controlled valve for outputting said second external pilot pressure therefrom to said clutch pressure control valve and for decreasingly adjusting said second external pilot pressure in accordance with an increase in a duty ratio; and control means for forcibly outputting a duty-cycle controlled exciting current of a predetermined high duty ratio to said duty-ratio controlled valve to reduce said controlled clutch pressure to a low pressure level when said pilot-operated directional control valve is maintained at said first valve position and additionally when said transmission is loaded heavier.

* * * * *